US011310699B2

(12) United States Patent
Chen et al.

(10) Patent No.: US 11,310,699 B2
(45) Date of Patent: Apr. 19, 2022

(54) NETWORK SWITCHING METHOD, COMMUNICATIONS APPARATUS, AND COMMUNICATIONS DEVICE

(71) Applicant: HUAWEI TECHNOLOGIES CO., LTD., Shenzhen (CN)

(72) Inventors: Zhongxian Chen, Shenzhen (CN); Weichen Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 16/975,632

(22) PCT Filed: Mar. 22, 2019

(86) PCT No.: PCT/CN2019/079182
§ 371 (c)(1),
(2) Date: Aug. 25, 2020

(87) PCT Pub. No.: WO2019/184805
PCT Pub. Date: Oct. 3, 2019

(65) Prior Publication Data
US 2020/0413296 A1 Dec. 31, 2020

(30) Foreign Application Priority Data

Mar. 27, 2018 (CN) .......................... 201810256243.X

(51) Int. Cl.
*H04W 36/00* (2009.01)
*H04W 36/14* (2009.01)
*H04W 88/06* (2009.01)

(52) U.S. Cl.
CPC .......... *H04W 36/00* (2013.01); *H04W 36/14* (2013.01)

(58) Field of Classification Search
CPC ......... H04W 36/0011; H04W 36/0069; H04W 36/14; H04W 88/06
See application file for complete search history.

(56) References Cited

U.S. PATENT DOCUMENTS 8,059,592 B2 * 11/2011 Low ...................... H04W 76/15
370/329
8,886,195 B2 * 11/2014 Srinivasan ........ H04W 36/0027
455/436

(Continued)

FOREIGN PATENT DOCUMENTS

| CN | 101938803 A | 1/2011 |
| CN | 101572709 B | 7/2012 |

(Continued)

*Primary Examiner* — Ahmed Elallam
(74) *Attorney, Agent, or Firm* — Rimon PC

(57) ABSTRACT

Embodiments of this application provide a network switching method that comprises connecting, by a terminal device, to a first network, where a first application on the terminal device is connected to the first network, switching, by the terminal device, from the first network to a second network, and retaining a connection between the first application and the first network. The method further comprises receiving, by the terminal device, a network connection request from a second application on the terminal device, and connecting, by the terminal device, the second application to the second network. The network switching method does not cause interruption to the connection between the first application and the first network and to the ongoing data transmission between the first application and the first network, thereby improving data transmission performance.

20 Claims, 13 Drawing Sheets

(56) References Cited

U.S. PATENT DOCUMENTS

| | | | | |
|---|---|---|---|---|
| 9,642,055 | B2* | 5/2017 | Vallabhu | H04W 36/18 |
| 9,756,543 | B2* | 9/2017 | Nagaraj | H04W 36/00837 |
| 9,973,534 | B2* | 5/2018 | Mahaffey | H04L 63/105 |
| 10,524,177 | B2* | 12/2019 | Miao | H04W 8/183 |
| 10,939,367 | B1* | 3/2021 | Koshy | H04W 36/32 |
| 2011/0223885 | A1 | 9/2011 | Salkintzis et al. | |

FOREIGN PATENT DOCUMENTS

| | | |
|---|---|---|
| CN | 103067994 A | 4/2013 |
| CN | 103973800 A | 8/2014 |
| CN | 104618971 A | 5/2015 |
| CN | 106060884 A | 10/2016 |
| CN | 107666696 A | 2/2018 |
| WO | 2015047322 A1 | 4/2015 |

\* cited by examiner

NETWORK SWITCHING METHOD, COMMUNICATIONS APPARATUS, AND COMMUNICATIONS DEVICE

CROSS-REFERENCE TO RELATED APPLICATIONS

This application is a National Stage of International Application No. PCT/CN2019/079182, filed on Mar. 22, 2019, which claims the priority to Chinese Patent Application No. 201810256243.X, filed on Mar. 27, 2018, both of which are hereby incorporated by reference in their entireties.

TECHNICAL FIELD

This application relates to the field of communications technologies, and in particular, to a network switching method, a communications apparatus, and a communications device.

BACKGROUND

In the prior art, a terminal device may perform data transmission in a plurality of network connection manners. For example, the terminal device may perform data transmission over a wireless local area network (WLAN), a mobile data network, Zigbee, or the like.

For example, the terminal device is currently connected to a mobile data network, and when the terminal device detects a WLAN that can be connected, the terminal device is automatically handed over to the WLAN. Alternatively, the terminal device is currently connected to a WLAN, and when the terminal device cannot properly retain a connection to the WLAN, the terminal device is automatically handed over to a mobile data network.

In a network switching process, the terminal device needs to disconnect from a current network. For example, when the terminal device detects a wireless-fidelity (WIFI) signal, the terminal device switches from a mobile data network to a Wi-Fi network. The terminal device forcibly disconnects from the mobile data network, and establishes a connection to the Wi-Fi network. This causes interruption to ongoing data transmission between the terminal device and the mobile data network, thereby affecting data transmission performance.

SUMMARY

This application provides a network switching method, a communications apparatus, and a communications device, to resolve a problem of poor data transmission performance caused by network switching in the prior art.

According to a first aspect, this application provides a network switching method. The method includes: connecting, by a terminal device, to a first network, where a first application on the terminal device connects to the first network; retaining a connection between the first application and the first network when the terminal device switches from the first network to a second network; and if a network connection request from the second application on the terminal device is received, connecting the second application to the second network. According to the solutions provided in this embodiment, the network switching does not cause an interruption to the connection between the first application and the first network, and the network switching does not cause an interruption to ongoing data transmission between the first application and the first network, thereby improving data transmission performance.

In a possible design, the switching, by the terminal device, from the first network to a second network, and retaining a connection between the first application and the first network includes:

switching, by the terminal device, from the first network to the second network, and keeping a first communications module in the terminal device enabled, where the first application is connected to the first network through the first communications module.

In a possible design, the method further includes:

switching, by the terminal device, from the first network to the second network, and recording information about a link between the terminal device and the first network, where the information about the link includes identification information of the first communications module and information about a connection over which the terminal device connects to the first network through the first communications module.

In a possible design, after the recording information about a link between the terminal device and the first network, the method further includes:

detecting whether the connection between the first application and the first network is ended; and if the connection between the first application and the first network is ended, deleting link information corresponding to the first application.

In a possible design, the method further includes:

when all link information corresponding to the first communications module is deleted, controlling the first communications module to be disabled.

In a possible design, the connecting, by the terminal device, the second application to the second network includes:

controlling, by the terminal device, a second communications module in the terminal device to be enabled; and connecting, by the terminal device, the second application to the second network through the second communications module.

In a possible design, after the switching, by the terminal device, from the first network to a second network, the method further includes:

receiving, by the terminal device, a network connection request from the first application; and connecting, by the terminal device, the first application to the second network.

In a possible design, the method further includes:

before the switching from the first network to the second network, receiving, by the terminal device, configuration information of a user, where the configuration information is used to retain the connection between the first application and the first network when the terminal device switches from the first network to the second network.

In a possible design, the method further includes:

when the terminal device switches from the first network to the second network, generating prompt information, where the prompt information is used to prompt a user whether to retain the connection between the first application and the first network.

In a possible design, the first application is at least one target application selected by the user from a plurality of applications on the terminal device.

In a possible design, the first network includes a mobile data network, and the second network includes a wireless local area network WLAN; and the first communications module in the terminal device includes a mobile data network adapter, and the second communications module in the terminal device includes a wireless fidelity Wi-Fi network adapter.

According to a second aspect, this application provides a communications apparatus. The communications apparatus includes:

a first communications module, configured to connect the communications apparatus to a first network, where a first application on the communications apparatus is connected to the first network;

a control module, configured to retain a connection between the first application and the first network when the communications apparatus switches from the first network to a second network;

a receiving module, configured to receive a network connection request from a second application on the communications apparatus; and a second communications module, configured to connect the communications apparatus to the second network, where the second application on the communications apparatus is connected to the second network.

In a possible design, the control module is specifically configured to: when the communications apparatus switches from the first network to the second network, keep a first communications module in the terminal device enabled, where the first application is connected to the first network through the first communications module.

In a possible design, the communications apparatus further includes:

a recording module, configured to record information about a link between the terminal device and the first network when the communications apparatus switches from the first network to the second network, where the information about the link includes identification information of the first communications module and information about a connection over which the terminal device connects to the first network through the first communications module.

In a possible design, the communications apparatus further includes:

a detection module, configured to: after the recording module records the information about the link between the terminal device and the first network, detect whether a connection between the first application and the first network is ended; and a deletion module, configured to: when the detection module detects that the connection between the first application and the first network is ended, delete link information corresponding to the first application.

In a possible design, the control module is further configured to: when all link information corresponding to the first communications module is deleted, control the first communications module to be disabled.

In a possible design, the control module is further configured to control a second communications module in the terminal device to be enabled; and the second application is connected to the second network through the second communications module.

In a possible design, after the communications apparatus switches from the first network to the second network, the receiving module is further configured to receive a network connection request from the first application; and the second communications module is further configured to connect the first application to the second network.

In a possible design, before the terminal device switches from the first network to the second network, the receiving module is further configured to receive configuration information of a user, where the configuration information is used to retain a connection between the first application and the first network when the terminal device switches from the first network to the second network.

In a possible design, the communications apparatus further includes:

a prompt information generating module, configured to generate prompt information when the terminal device switches from the first network to the second network, where the prompt information is used to prompt a user whether to retain the connection between the first application and the first network.

In a possible design, the first application is at least one target application selected by the user from a plurality of applications on the terminal device.

In a possible design, the first network includes a mobile data network, and the second network includes a wireless local area network WLAN; and The first communications module in the communications apparatus includes a mobile data network adapter, and the second communications module in the communications apparatus includes a wireless fidelity Wi-Fi network adapter.

According to a third aspect, this application provides a communications device, including:

an interface and a processor, where the interface is coupled to the processor; and the processor is configured to perform the network switching method according to the first aspect.

In a possible design, the communications device in the third aspect may be a terminal device, or may be a chip; and the interface and the processor may be integrated on a same chip, or may be separately disposed on different chips.

According to a fourth aspect, this application provides a computer-readable storage medium. The computer-readable storage medium stores a computer program, and when the computer program is run on a computer, the computer is enabled to perform the method according to the first aspect.

According to a fifth aspect, this application provides a computer program, where when the computer program is executed by a computer, the computer program is used to perform the method according to the first aspect.

In a possible design, the program in the fifth aspect may be all or partially stored on a storage medium packaged with a processor, or may be partially or all stored on a memory that is not packaged with the processor.

According to a sixth aspect, this application provides a communications device, including:

a memory and a processor, where the memory is coupled to the processor; and the processor is configured to perform the method according to the first aspect.

In a possible design, the communications device in the sixth aspect may be a terminal device, or may be a chip; and the memory and the processor may be integrated on a same chip, or may be separately disposed on different chips.

According to a seventh aspect, this application provides a processor. The processor includes:

at least one circuit, configured to perform switching from a first network to a second network, and retain a connection between a first application and the first network;

at least one circuit, configured to receive a network connection request from a second application on a terminal device; and at least one circuit, configured to connect the second application to the second network.

In a possible design, the processor in the seventh aspect may be a chip.

It can be learned that, in the foregoing aspects, before the terminal device switches from the first network to the second network, the first application on the terminal device is connected to the first network; when the terminal device switches from the first network to the second network, the connection between the first application and the first network is retained; and if the terminal device receives the network connection request from the second application, the second application connects to the second network, so that the network switching does not cause an interruption to the connection between the first application and the first network, and the network switching does not cause an interruption in ongoing data transmission between the first application and the first network, thereby improving data transmission performance.

DESCRIPTION OF EMBODIMENTS

Figure 1:
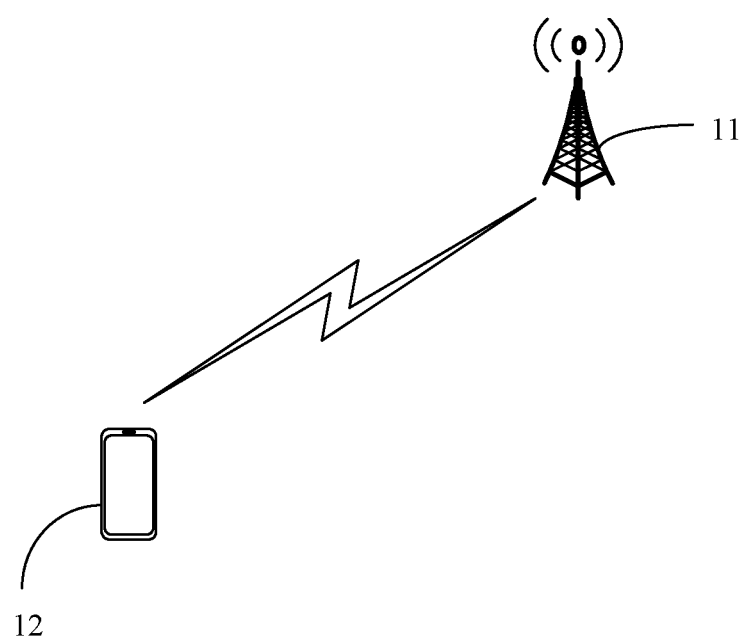
FIG. 1 is a schematic diagram of an application scenario according to an embodiment of this application.

Embodiments of this application may be applied to various types of communications systems. FIG. 1 is a schematic diagram of an application scenario according to an embodiment of this application. A network architecture shown in FIG. 1 mainly includes a network device 11 and a terminal device 12 (User Equipment, UE).

(1) The network device 11 may be a network side device, for example, a wireless-fidelity (Wireless-Fidelity, WIFI) access point AP or a next-generation communications base station, for example, a 5G gNB or a small cell, a micro base station, or a TRP, or may be a relay station, an access point, an in-vehicle device, a wearable device, or the like. In this embodiment, base stations in communications systems of different communications standards are different. For differentiation, a base station in the 4G communications system is referred to as an LTE eNB, a base station in the 5G communications system is referred to as an NR gNB, and a base station that supports both the 4G communications system and the 5G communications system is referred to as an eLTE eNB. These names are merely for ease of differentiation, and do not constitute limitation.

(2) The terminal device 12 may be referred to an access terminal, a subscriber unit, a subscriber station, a mobile station, a mobile console, a remote station, a remote terminal, a mobile device, a user terminal, a terminal, a wireless communication device, a user agent, a user apparatus, or the like. The access terminal may be a cellular phone, a cordless phone, a session initiation protocol (SIP) phone, a wireless local loop ("WLL" for short) station, a personal digital assistant (PDA), a handheld device having a wireless communication function, a computing device, another processing device connected to a wireless modem, an in-vehicle device, a wearable device, a terminal in a 5G network, or a STA in a next-generation Wi-Fi.

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In addition, the embodiments of this application may be applied to not only a 5G communications system, but also another system that may appear in the future.

Currently, a terminal device may perform data transmission in a plurality of network connection manners. For example, the terminal device may perform data transmission over a wireless local area network (Wireless Local Area Networks, WLAN), a mobile data network, Zigbee, or the like. For example, the terminal device is currently connected to a mobile data network, and when the terminal device detects a WLAN that can be connected, the terminal device is automatically handed over to the WLAN. Alternatively, the terminal device is currently connected to a WLAN, and when the terminal device cannot properly retain a connection to the WLAN, the terminal device is automatically handed over to a mobile data network.

Figure 2:
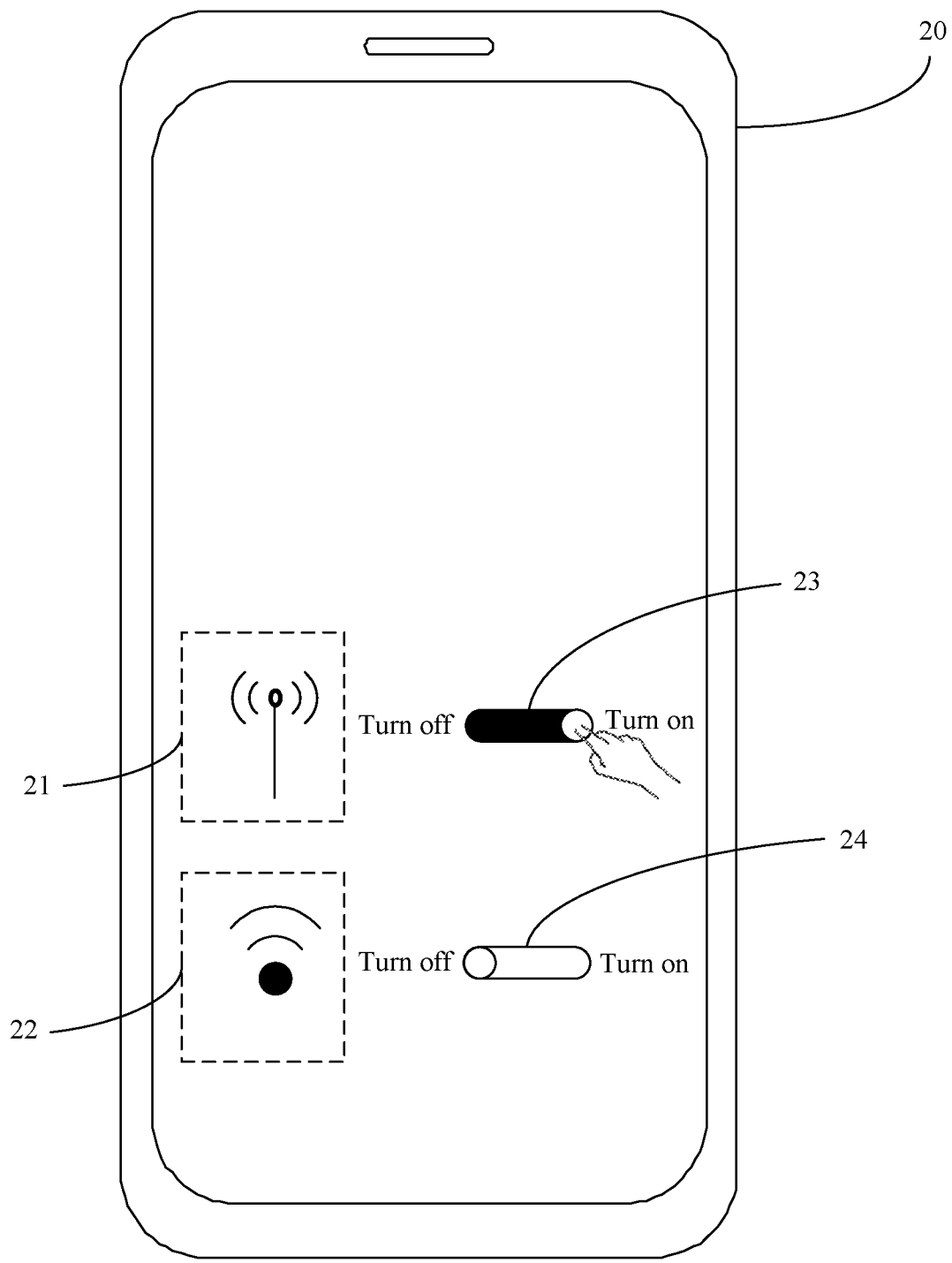
FIG. 2 is a schematic diagram of a user interface according to an embodiment of this application.
Figure 3:
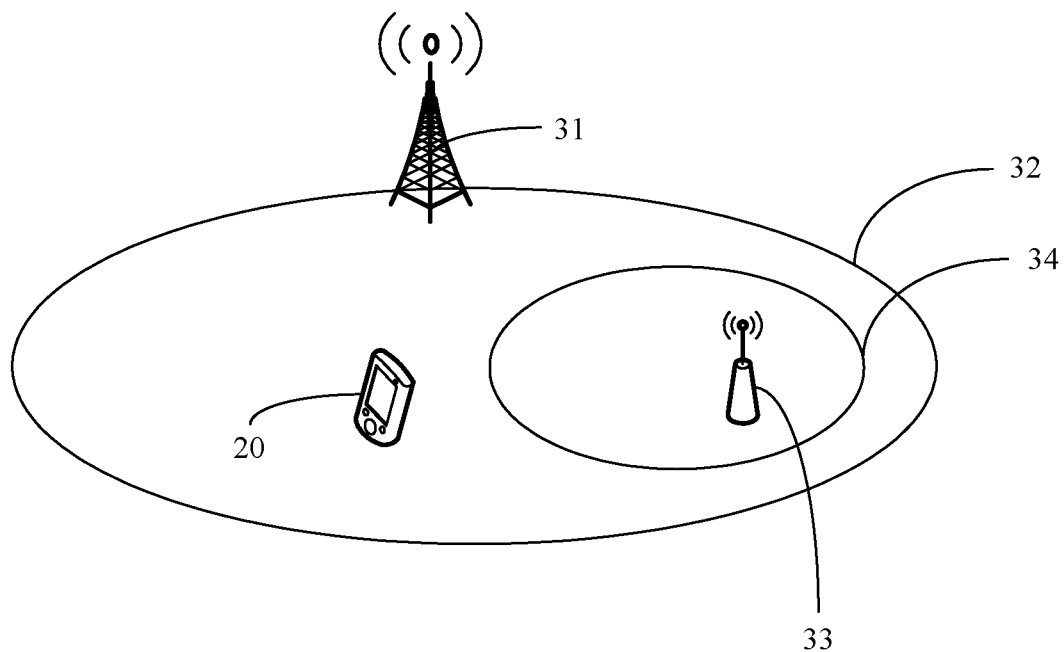
FIG. 3 is a schematic diagram of another application scenario according to an embodiment of this application.

As shown in FIG. 2, 20 represents a terminal device, 21 represents an icon of a mobile data network that the terminal device 20 can be connected to, 22 represents an icon of a Wi-Fi network that the terminal device 20 can be connected to, and the terminal device 20 is provided with a mobile data network switch 23 and a Wi-Fi network switch 24. A user may perform a turn-on or turn-off operation on either of the mobile data network switch 23 and the Wi-Fi network switch 24. For example, when the user turns on the mobile data network switch 23, the terminal device 20 may transmit data over the mobile data network. For example, as shown in FIG. 3, the terminal device 20 is located within a coverage 32 of a base station 31. When the user turns on the mobile data network switch 23 on the terminal device 20, the terminal device 20 may transmit data through the base station 31. Herein, a user interface is only an example for description, and specific content and a form of the user interface are not limited.

Figure 4:
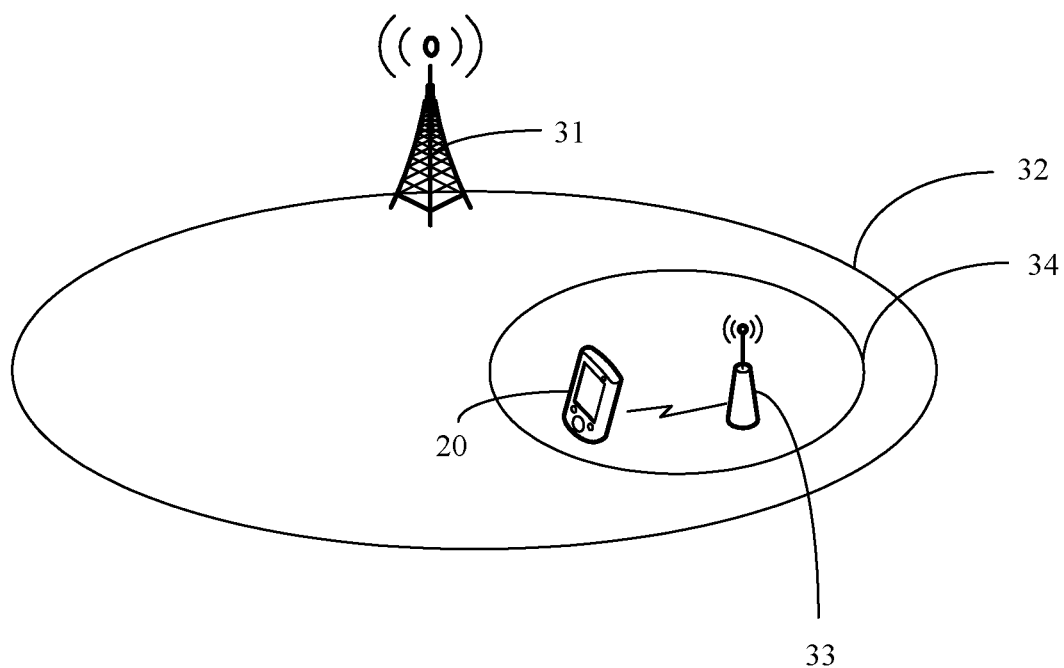
FIG. 4 is a schematic diagram of yet another application scenario according to an embodiment of this application.

As shown in FIG. 4, when the terminal device 20 moves to a coverage 34 of an access point AP 33 of Wi-Fi, the user turns on a Wi-Fi network switch 24 on the terminal device 20. At this time, the terminal device 20 may perform data transmission through the access point AP 33. Alternatively, when the terminal device 20 detects a Wi-Fi network signal, the terminal device 20 automatically turns on the Wi-Fi network switch 24 on the terminal device 20, establishes a connection to the access point AP 33, and performs data transmission through the access point AP 33.

For example, at a moment t1, the terminal device 20 performs data transmission through the base station 31. At a moment after the moment t1, for example, at a moment t2, the terminal device 20 detects an available Wi-Fi network. The available Wi-Fi network may be specifically an authorized Wi-Fi network, or may be a Wi-Fi network that the terminal device 20 has been connected to. To reduce mobile data network traffic of the terminal device 20, the terminal device 20 switches from a mobile data network to the Wi-Fi network at the moment t2. That is, at the moment t2, the terminal device 20 disconnects from the base station 31, and establishes a connection to the access point AP 33. At this time, data transmission performed by the terminal device 20 through the base station 31 is interrupted, affecting data transmission performance. For example, for a service requiring relatively high real-time performance on the terminal device 20, for example, a game service, at the moment t1, the terminal device 20 performs real-time data transmission with a game server through the base station 31; and at the moment t2, the terminal device 20 detects the available Wi-Fi network, and the terminal device 20 switches from the mobile data network to the Wi-Fi network. As a result, the game service on the terminal device 20 is interrupted, and the user may lose the game.

As shown in FIG. 2, the mobile data network switch 23 and the Wi-Fi network switch 24 are two independent switches. When both the mobile data network switch 23 and the Wi-Fi network switch 24 are in a turn-on state, the terminal device 20 may determine a default route, for example, a Wi-Fi network, so that when the terminal device 20 detects an available Wi-Fi network, data is transmitted over the Wi-Fi network.

Figure 5:
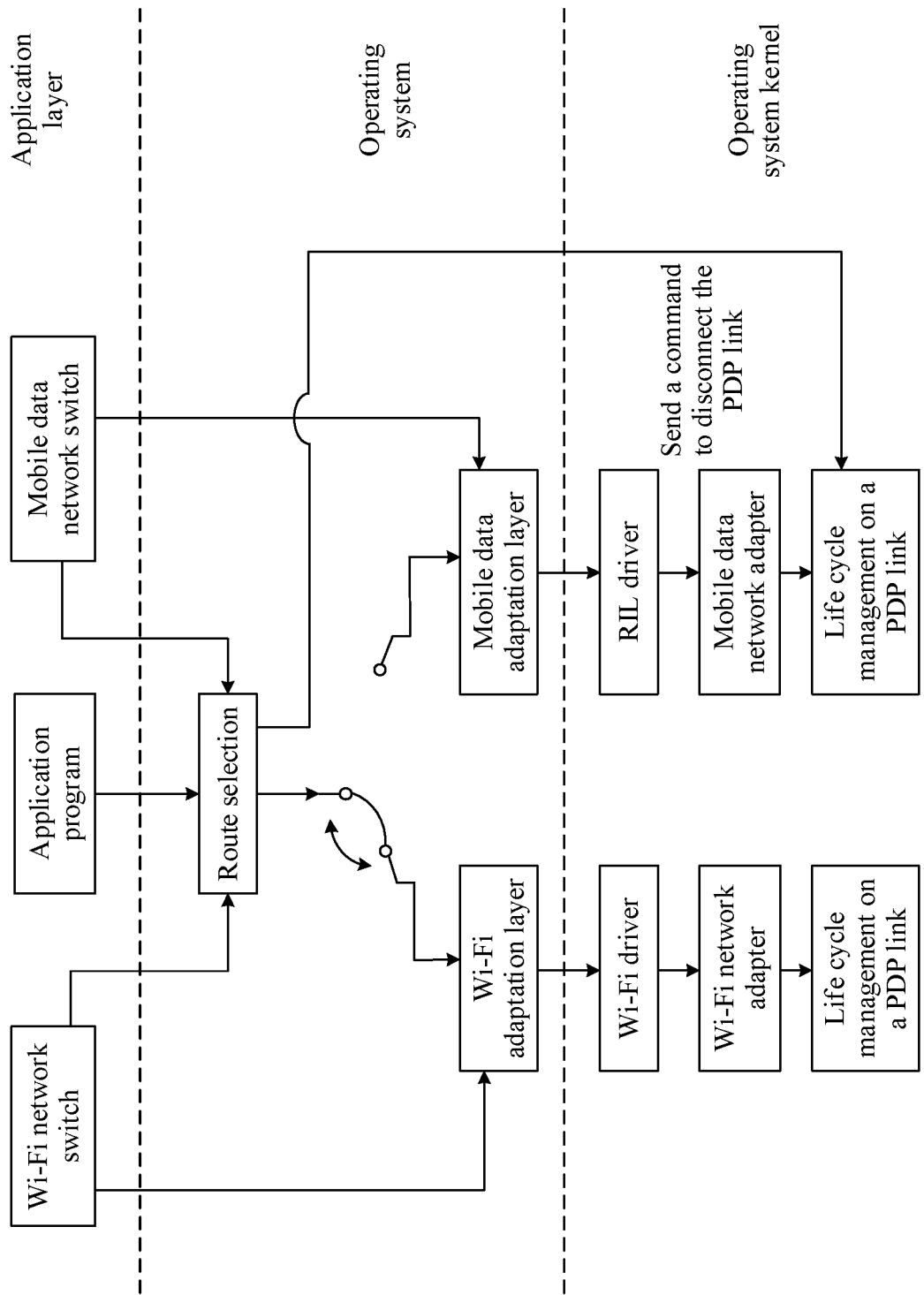
FIG. 5 is a schematic diagram of a system architecture of a terminal device according to an embodiment of this application.

As shown in FIG. 5, a Wi-Fi network switch may be specifically the Wi-Fi network switch 24 on the user interface shown in FIG. 2, and a mobile data network switch may be specifically the mobile data network switch 23 on the user interface shown in FIG. 2. In addition, an application program (Application, APP) may be further installed on the terminal device 20. The Wi-Fi network switch, the mobile data network switch, and the application program are located at an application layer of the terminal device 20. Route selection means that the terminal device 20 uses a Wi-Fi network or a mobile data network by default for data transmission. For example, when the terminal device 20 does not detect a Wi-Fi signal of an available Wi-Fi network, the terminal device 20 uses a mobile data network by default for data transmission. When the terminal device 20 detects a Wi-Fi signal of an available Wi-Fi network, the terminal device 20 uses the Wi-Fi network for data transmission. A Wi-Fi adaptation layer is a network adaptation layer at which an operating system of the terminal device 20 provides a service for an upper-layer application, to implement a connection to a Wi-Fi network. A mobile data adaptation layer is a network adaptation layer at which the operating system of the terminal device 20 provides a service for an upper-layer application, to implement a connection to a mobile data network. A Wi-Fi driver is a driver program that runs in an operating system kernel to implement a Wi-Fi function. An RIL driver is a driver program that runs in an operating system kernel to implement a mobile data network communications protocol. A PDP link defines a link and a connection mode of a socket network connection based on a routing rule delivered by an upper layer, and during network switching, all links are disconnected by default.

As shown in FIG. 5, when the terminal device 20 does not detect a Wi-Fi signal of an available Wi-Fi network, a route selection switch is connected to the mobile data adaptation layer, and in a process of establishing a socket, the mobile data adaptation layer uses default route selection, for example, connects to a mobile data network through a mobile data network adapter. When the terminal device 20 switches from the mobile data network to the Wi-Fi network, the route selection switch connects to the Wi-Fi adaptation layer, and the default route selection is changed, the Wi-Fi network is connected through the Wi-Fi network adapter. At this time, the mobile data adaptation layer sends a disabling instruction to the mobile data network adapter, so that the terminal device 20 disconnects from the mobile data network. If the terminal device 20 still performs data transmission over the mobile data network when the terminal device 20 switches from the mobile data network to the Wi-Fi network, data transmission is interrupted after the network switching, thereby affecting data transmission performance. To resolve this problem, this application provides a network switching method, and specifically provides the following several embodiments. The following describes the embodiments with reference to specific scenarios.

Figure 6:
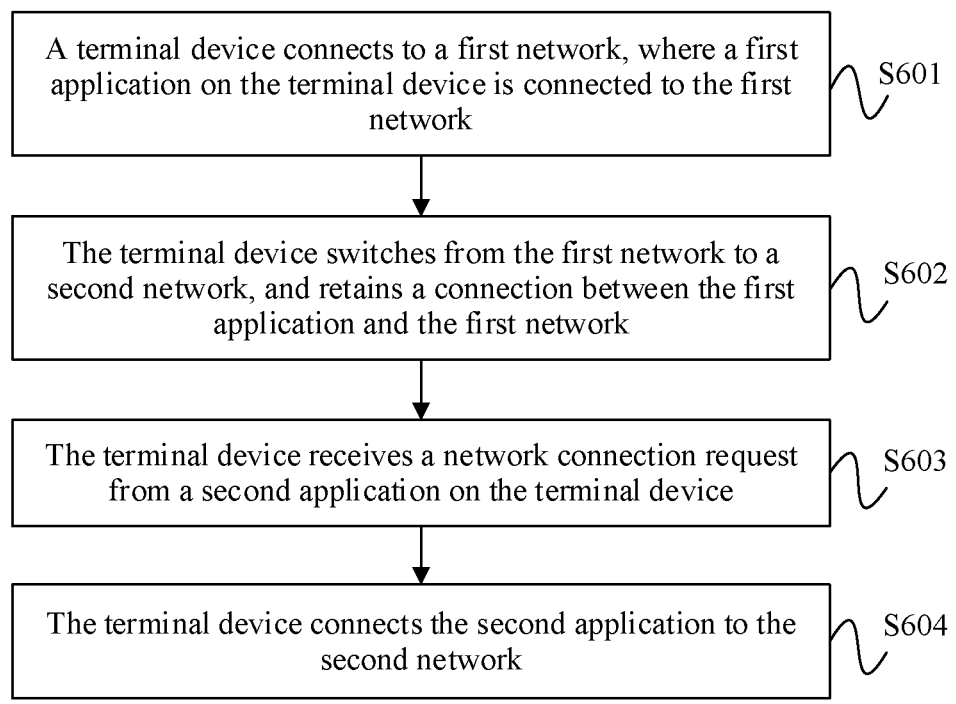
FIG. 6 is a schematic flowchart of a network switching method according to an embodiment of this application.

FIG. 6 is a schematic flowchart of the network switching method according to an embodiment of this application. As shown in FIG. 6, the method specifically includes the following steps.

S601. A terminal device connects to a first network, where a first application on the terminal device connects to the first network.

In this embodiment, the terminal device may connect to different networks. For example, the terminal device may connect to the first network, or may connect to a second network. The first network may be specifically a mobile data network, and the second network may be specifically a WLAN network. Alternatively, the first network may be specifically a WLAN network, and the second network may be specifically a mobile data network. Alternatively, the first network may be specifically a first mobile data network, and the second network may be specifically a second mobile data network. In another embodiment, the first network is not limited to the WLAN network or the mobile data network, and the second network is not limited to the mobile data network or the WLAN network. That is, the first network and the second network may be different networks other than the mobile data network or the WLAN network. For example, the first network is a WLAN network, and the second network is a Zigbee network. The terminal device may switch from the first network to the second network, or may switch from the second network to the first network.

In this embodiment, an example in which the first network is the mobile data network and the second network is the WLAN network is used for description. The WLAN network may be specifically a Wi-Fi network. The first application on the terminal device may be specifically an application program, for example, an application program A, that is on the terminal device and that is connected to the mobile data network when the terminal device switches from the mobile data network to the Wi-Fi network.

As shown in FIG. 4, at the moment t1, the application program A on the terminal device 20 connects to the mobile data network. Specifically, the application program A performs data transmission with a network device, for example, the base station 31, in the mobile data network through the terminal device 20.

S602. The terminal device switches from the first network to the second network, and retains a connection between the first application and the first network.

At a moment after the moment t1, for example, at the moment t2, the terminal device 20 moves to the coverage 34 of the access point AP 33, and detects an available Wi-Fi signal. The Wi-Fi network may be specifically an authorized Wi-Fi network, or may be a Wi-Fi network that the terminal device 20 has been connected to. At the moment t2, the terminal device 20 switches from the mobile data network to the Wi-Fi network, and at the same time, retains a connection between the application program A and the mobile data network, so that the network switching does not cause an interruption to data transmission between the application program A and the base station 31.

In this embodiment, a first communications module and a second communications module may be disposed on the terminal device. Specifically, the terminal device may be connected to the first network through the first communications module, and connected to the second network through the second communications module. In this embodiment, an example in which the first network is the mobile data network and the second network is the WLAN network is used for description. Correspondingly, the first communications module includes a mobile data network adapter, and the second communications module includes a wireless fidelity Wi-Fi network adapter.

Figure 7:
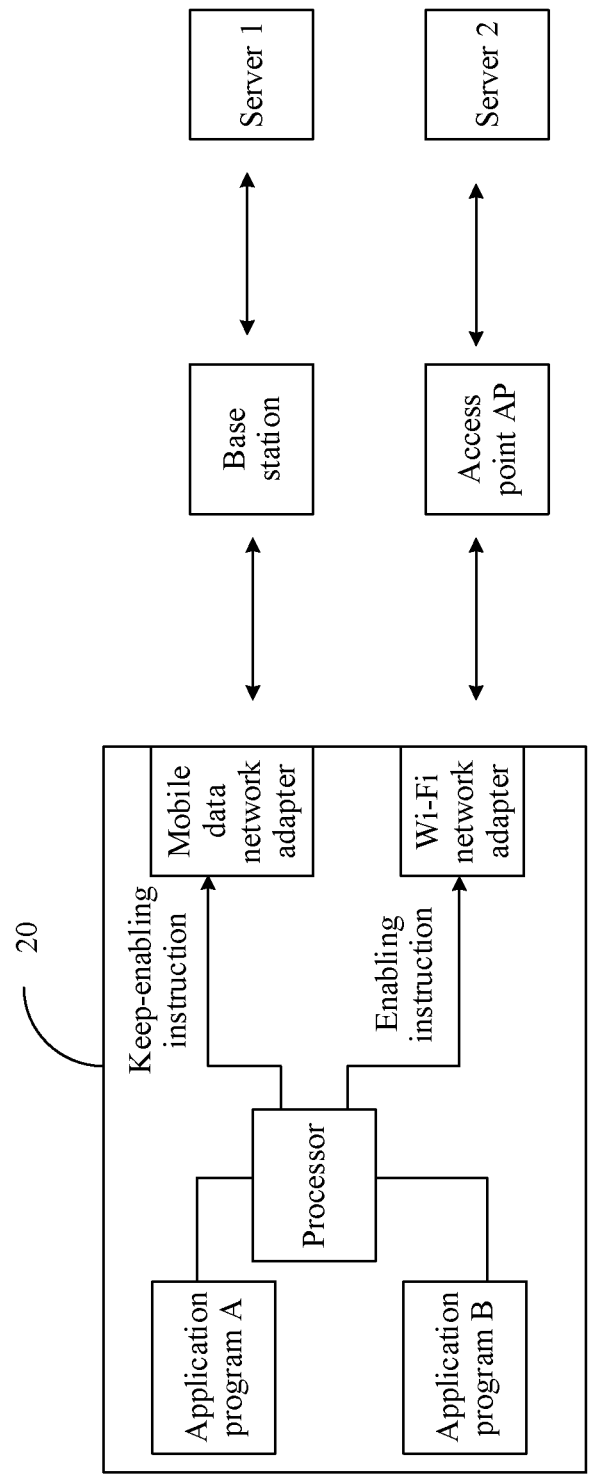
FIG. 7 is a schematic flowchart of another network switching method according to an embodiment of this application.

As shown in FIG. 7, the terminal device 20 includes a mobile data network adapter, and the terminal device 20 may perform communication with a network device, for example, a base station, in the mobile data network through the mobile data network adapter. In addition, the terminal device 20 further includes a Wi-Fi network adapter, and the terminal device 20 may perform communication with a network device, for example, an access point AP, in the Wi-Fi network through the Wi-Fi network adapter.

In an implementable manner in which the terminal device 20 is handed over from the mobile data network to the Wi-Fi network, and retains the connection between the application program A and the mobile data network simultaneously, when the terminal device 20 switches from the mobile data network to the Wi-Fi network, a processor in the terminal device 20 sends a keep-enabling instruction to the mobile data network adapter, to keep the mobile data network adapter in an enabled state, so that the application program A may retain a connection to a network device, for example, a base station, in the mobile data network through the mobile data network adapter.

S603. The terminal device receives a network connection request from a second application on the terminal device.

In this embodiment, the terminal device is not limited to including the first application, and further includes the second application. The second application may be specifically an application program that is on the terminal device and that is not connected to the mobile data network when the terminal device switches from the mobile data network to the Wi-Fi network, for example, an application program B shown in FIG. 7. After the terminal device 20 switches from the mobile data network to the Wi-Fi network, the terminal device 20 may receive a network connection request from the application program B. It may be understood that, in another embodiment, the application program installed on the terminal device is not limited to the application program A and the application program B.

S604. The terminal device connects the second application to the second network.

Because the terminal device 20 switches from the mobile data network to the Wi-Fi network, when receiving the network connection request from the application program B, the terminal device 20 connects the application program B to the Wi-Fi network.

In this embodiment, in an implementable manner in which the terminal device connects the second application to the second network, the terminal device controls a second communications module in the terminal device to be enabled, and the terminal device connects the second application to the second network through the second communications module. Specifically, when connecting the application program B to the Wi-Fi network, the terminal device 20 may control the Wi-Fi network adapter in the terminal device 20 to be enabled, and connect the application program B to the Wi-Fi network through the Wi-Fi network adapter.

As shown in FIG. 7, when the terminal device 20 switches from the mobile data network to the Wi-Fi network, a processor in the terminal device 20 sends an enabling instruction to the Wi-Fi network adapter, and the processor receives the network connection request from the application program B, and sends the network connection request to a network device, for example, an access point AP, in the Wi-Fi network through the Wi-Fi network adapter. The access point AP feeds back a connection response to the application program B through the Wi-Fi network adapter, so that the application program B can establish a connection to the access point AP through the Wi-Fi network adapter and perform data transmission.

It can be learned from the foregoing embodiment that, when the terminal device switches from the mobile data network to the Wi-Fi network, the processor of the terminal device 20 may separately control states of the mobile data network adapter and the Wi-Fi network adapter, so that the mobile data network adapter and the Wi-Fi network adapter may be in an enabled state simultaneously. The application program A retains a connection to the mobile data network; the application program B may be connected to the Wi-Fi network at the same time, that is, different application programs on the terminal device can respectively connect to different types of networks simultaneously. The following describes a principle that different applications on the terminal device can respectively connect to different types of networks simultaneously.

As shown in FIG. 7, assuming that at a moment t1, the application program A is in an enabled state, the application program B is in a disabled state, a terminal device 20 does not detect a Wi-Fi signal of an available Wi-Fi network, and the terminal device 20 is connected to the mobile data network. At this time, the terminal device 20 connects the application program A to the mobile data network. Specifically, a processor of the terminal device 20 sends a network connection request from the application program A to the base station in the mobile data network through the mobile data network adapter. After the application program A successfully establishes a connection to the base station through the mobile data network adapter, the application program A performs data transmission with the base station through the mobile data network adapter. For example, the processor of the terminal device 20 sends a service packet of the application program A to the base station in the mobile data network through the mobile data network adapter.

At a moment t2 after the moment t1, the terminal device 20 detects a Wi-Fi signal of an available Wi-Fi network. At this time, if data transmission between the application program A and the base station is not ended, the processor sends a keep-enabling instruction to the mobile data network adapter, to keep the mobile data network adapter in the enabled state, so that the application program A retains the connection to the base station. In addition, when the terminal device 20 detects an available Wi-Fi network, the processor sends an enabling instruction to the Wi-Fi network adapter, so that the Wi-Fi network adapter changes from a disabled state to an enabled state. After receiving the network connection request from the application program B, the processor connects the application program B to an access point AP in the Wi-Fi network through the Wi-Fi network adapter. For example, the processor sends, through the Wi-Fi network adapter, the network connection request from the application program B to the access point AP in the Wi-Fi network for connection. It can be learned that when the terminal device 20 switches from the mobile data network to the Wi-Fi network, if the connection between the application program A and the mobile data network is not ended, the terminal device 20 does not forcibly disable the mobile data network adapter during the network switching. The processor in the terminal device 20 may control the mobile data network adapter and the Wi-Fi network adapter to be in an enabled state simultaneously. The application program A may connect to the base station through the mobile data network adapter, and at the same time, the application program B may connect to the access point AP through the Wi-Fi network adapter.

In addition, when the terminal device switches from the first network to the second network, information about a link between the terminal device and the first network may further be recorded, where the information about the link includes identification information of the first communications module and information about a connection over which the terminal device connects to the first network through the first communications module.

As shown in FIG. 7, the base station may communicate with a server 1, and the access point AP may communicate with a server 2, where the server 1 and the server 2 may be a same server or may be different servers. An application program, for example, the application program A or the application program B, of the terminal device 20 may perform communication with the server 1 through the mobile data network adapter and the base station, or may perform communication with the server 2 through the Wi-Fi network adapter and the access point AP. Specifically, the application program A or the application program B may perform communication with a service process on the server 1 through the mobile data network adapter and the base station, or may perform communication with a service process on the server 2 through the Wi-Fi network adapter and the access point AP. The application program of the terminal device 20 may be used as a client process, and communication between the client process and the service process is implemented by using a socket.

When the terminal device 20 does not detect a Wi-Fi signal of an available Wi-Fi network, and the terminal device 20 is connected to the mobile data network, the processor of the terminal device 20 receives a network connection request from the application program A. Optionally, the network connection request from the application program A is used to establish a connection to the server 1. The processor creates a socket A corresponding to the application program A, and establishes a socket A connection to the server 1 through the mobile data network adapter and the base station. After the socket A connection is established successfully, the application program A may perform service communication with the server 1 through the mobile data network adapter and the base station. When the terminal device 20 detects a Wi-Fi signal of an available Wi-Fi network, and the socket A connection between the application program A and the server 1 is not ended, the processor may record a correspondence between the socket A and identification information of the mobile data network adapter, where the correspondence may be used as one piece of link information, and the link information indicates that the socket A connection between the application program A and the server 1 is established through the mobile data network adapter of the terminal device 20. After recording the link information, the processor detects whether the socket A connection between the application program A and the server 1 is ended. If the socket A connection is not ended, the processor continues to keep the mobile data network adapter in the enabled state, so that the application program A and the server 1 can retain service communication through the mobile data network adapter; if the socket A connection is ended, the processor deletes the correspondence between the socket A and the identification information of the mobile data network adapter, and controls the mobile data network adapter to be disabled. In this embodiment, that the socket A connection between the application program A and the server 1 is ended may include the following several possible cases.

In a possible case, after the terminal device 20 switches from the mobile data network to the Wi-Fi network, the terminal device 20 sends prompt information to the user. A specific prompt manner of the prompt information is not limited herein. For example, the prompt manner may be a pop-up box, a voice prompt, vibration, or the like. The prompt information is used to prompt the user that the application program A currently keeps a connection to the mobile data network, and whether to disconnect the connection; and if the connection is not disconnected, more mobile data network traffic may be consumed. If the user determines to disconnect the application program A from the mobile data network, the terminal device 20 may control, according to confirmation information of the user, the connection between the application program A and the mobile data network to be disconnected, and the socket A connection between the application program A and the server 1 is ended.

In another possible case, after the terminal device 20 switches from the mobile data network to the Wi-Fi network, the terminal device 20 detects whether transmission of service data between the application program A and the server 1 is stopped. If all service packets that the application program A requests to obtain from the server 1 are sent by the server 1 to the application program, the terminal device 20 controls the application program A to disconnect from the mobile data network, and the socket A connection between the application program A and the server 1 is ended.

After the socket A connection between the application program A and the server 1 is ended, and the terminal device 20 controls the mobile data network adapter to be disabled, if the application program A requests to connect to a server again, for example, the server 2, and the terminal device 20 has switched from the mobile data network to the Wi-Fi network, the terminal device 20 establishes a connection between the application program A and the server 2 through the Wi-Fi network adapter.

In addition, in another embodiment, the application program of the terminal device 20 is not limited to the application program A and the application program B, and another application program such as an application program C or an application program D may be installed. When the terminal device 20 does not detect a Wi-Fi signal of an available Wi-Fi network, and the terminal device 20 connects to the mobile data network, the processor of the terminal device 20 may receive network connection requests of the application program A, the application program C, and the application program D. Optionally, the application program A, the application program C, and the application program D may request to connect to different servers. For example, the application program A requests to connect to the server 1, the application program C requests to connect to a server 3, and the application program D requests to connect to a server 4. Correspondingly, the processor establishes, through the mobile data network adapter and the base station, a socket A connection between the application program A and the server 1, a socket C connection between the application program C and the server 3, and a socket D connection between the application program D and the server 4. In addition, a same application program may further request to connect to a plurality of different servers. For example, the application program A may further request to connect to the server 1 and the server 4. Herein, a connection between the application program A and the server 1 is denoted as a socket A1 connection, and the connection between the application program A and the server 4 is denoted as a socket A2 connection. When the terminal device 20 detects a Wi-Fi signal of an available Wi-Fi network, the processor records all correspondences between the identifier information of the mobile data network adapter and socket connections established through the mobile data network adapter. For example, the processor creates a list shown in the following Table 1.

TABLE 1

| Identification information of the mobile data network adapter | Socket A1 |
| Identification information of the mobile data network adapter | Socket A2 |
| Identification information of the mobile data network adapter | Socket C |
| Identification information of the mobile data network adapter | Socket D |

As shown in Table 1, each row in Table 1 represents one piece of link information. The link information indicates that a connection between an application program and a server is established through the mobile data network adapter of the terminal device. When the terminal device 20 switches from a mobile data network to a Wi-Fi network, a mobile data network adapter is kept in an enabled state, so that the application program corresponding to each piece of link information in Table 1 keeps connected to the server through the mobile data network adapter, that is, retains each socket connection in Table 1 uninterrupted. The socket connection may be used as a persistent connection. During a network switching, the link information shown in Table 1 is recorded, and the mobile data network adapter is kept in the enabled state, so that the network switching does not cause an interruption to the persistent connection, and therefore, the network switching does not cause an interruption to service data transmission, a heartbeat packet, and the like between the application program and the server.

After creating the list shown in Table 1, the processor detects whether the socket A1 connection, the socket A2 connection, the socket C connection, or the socket D connection is ended. When the socket A connection between the application program A and the server 1 is ended, the processor deletes a first row from Table 1; or, when the application program C requests to end the socket C connection to the server 3, the processor deletes a third row from Table 1, and so on. However, provided that Table 1 is not empty, it indicates that at least one application program on the terminal device needs to retain a connection to the server through the mobile data network adapter. In this case, the processor continues to keep the mobile data network adapter in the enabled state. When the link information corresponding to the identification information of the mobile data network adapter in Table 1 is all deleted, and Table 1 is empty, it indicates that the application program on the terminal device in the Wi-Fi network does not need to retain the connection to the server through the mobile data network adapter. In this case, the processor controls the mobile data network adapter to be disabled. When the application program A, the application program C, or the application program D needs to connect to the server again, the processor establishes a socket connection between the application program and the server through the Wi-Fi network adapter and the access point AP.

Similarly, when the terminal device switches from the Wi-Fi network to the mobile data network, the terminal device also records information about a link between the terminal device and the Wi-Fi network. For example, as shown in FIG. 4, the terminal device 20 moves to the coverage of the access point AP 33. After the terminal device 20 detects an available Wi-Fi signal, the application program B on the terminal device 20 requests to connect to a server, for example, the server 2, and the processor in the terminal device 20 establishes a socket B connection between the application program B and the server 2 through the Wi-Fi network adapter and the access point AP. As shown in FIG. 4, the terminal device 20 is located within the coverage of the access point AP 33. If the user turns off the Wi-Fi network switch and turns on the mobile data network switch, the terminal device 20 switches from the Wi-Fi network to the mobile data network, and the processor records a correspondence between the socket B and identification information of the Wi-Fi network adapter. The correspondence may be used as one piece of link information, as shown in Table 2:

TABLE 2

| Identification information of the Wi-Fi network adapter | Socket B |

The link information in Table 2 indicates that the socket B connection between the application program B and the server 2 is established through the Wi-Fi network adapter of the terminal device 20. This is only an example for description, and a quantity of pieces of link information corresponding to the Wi-Fi network adapter is not limited. Specifically, provided that the socket B connection between the application program B and the server 2 is not ended, the processor may keep the Wi-Fi network adapter in the enabled state, so that the application program B and the server 2 may retain service communication through the Wi-Fi network adapter. When the socket B connection between the application program B and the server 2 is ended, the processor deletes the correspondence between the socket B and the identification information of the Wi-Fi network adapter, and controls the Wi-Fi network adapter to be disabled.

In this embodiment, the processor separately sets the link information corresponding to the mobile data network adapter, for example, Table 1, and the link information corresponding to the Wi-Fi network adapter, for example, Table 2. In another embodiment, the processor may alternatively record, in one list, the link information corresponding to the mobile data network adapter and the link information corresponding to the Wi-Fi network adapter.

In this embodiment, before the terminal device switches from the first network to the second network, the first application on the terminal device is connected to the first network. When the terminal device switches from the first network to the second network, the first application retains a connection to the first network. If the terminal device receives a network connection request from the second application, the second application connects to the second network, so that the network switching does not cause an interruption to the connection between the first application and the first network, and the network switching does not cause an interruption to ongoing data transmission between the first application and the first network, thereby improving data transmission performance.

Based on the foregoing embodiment, when the terminal device 20 switches from the mobile data network to the Wi-Fi network, if the terminal device 20 detects that an application program on the terminal device 20 retains a connection to the mobile data network, the terminal device 20 controls the application program to keep the connection to the mobile data network, and a process and a method for keeping the connection are similar to those in the foregoing embodiment. Details are not described herein again. After the application program is disconnected from the mobile data network, the terminal device 20 may control the application program to connect to the Wi-Fi network.

For example, an application program A and an application program B are installed on the terminal device 20. At a moment t1, the application program A connects to the mobile data network, the application program A obtains video data in a video server in real time through the mobile data network, and the application program B is in a closed state. At a moment t2 after the moment t1, the terminal device 20 detects an available Wi-Fi signal, and the terminal device 20 switches from the mobile data network to a Wi-Fi network. At this time, the application program A still retains the communication connection to the mobile data network, and the terminal device 20 controls the application program A to retain the connection to the mobile data network, so that the application program A continues to obtain the video data in the video server in real time over the mobile data network, and the video data obtained by the application program A is not interrupted. In other words, at a moment of the network switching, if an application program on the terminal device 20 is connected to the network before the switching, the network switching does not cause an interruption to the connection between the application program and the network before the switching. At a moment t3 after the moment t2, if the application program A is disconnected from the mobile data network, the terminal device 20 connects the application program A to the Wi-Fi network. Specifically, the terminal device 20 establishes a connection between the application program A and the Wi-Fi network through the Wi-Fi network adapter, so that when the application program A is disconnected from the original network, namely, the mobile data network, the application program A is immediately connected to the Wi-Fi network, to ensure that the application program A can obtain the video data over the Wi-Fi network. In this way, video data receiving of the application program A is not affected after the application program A is disconnected from the original network, thereby further improving data transmission performance.

Figure 8:
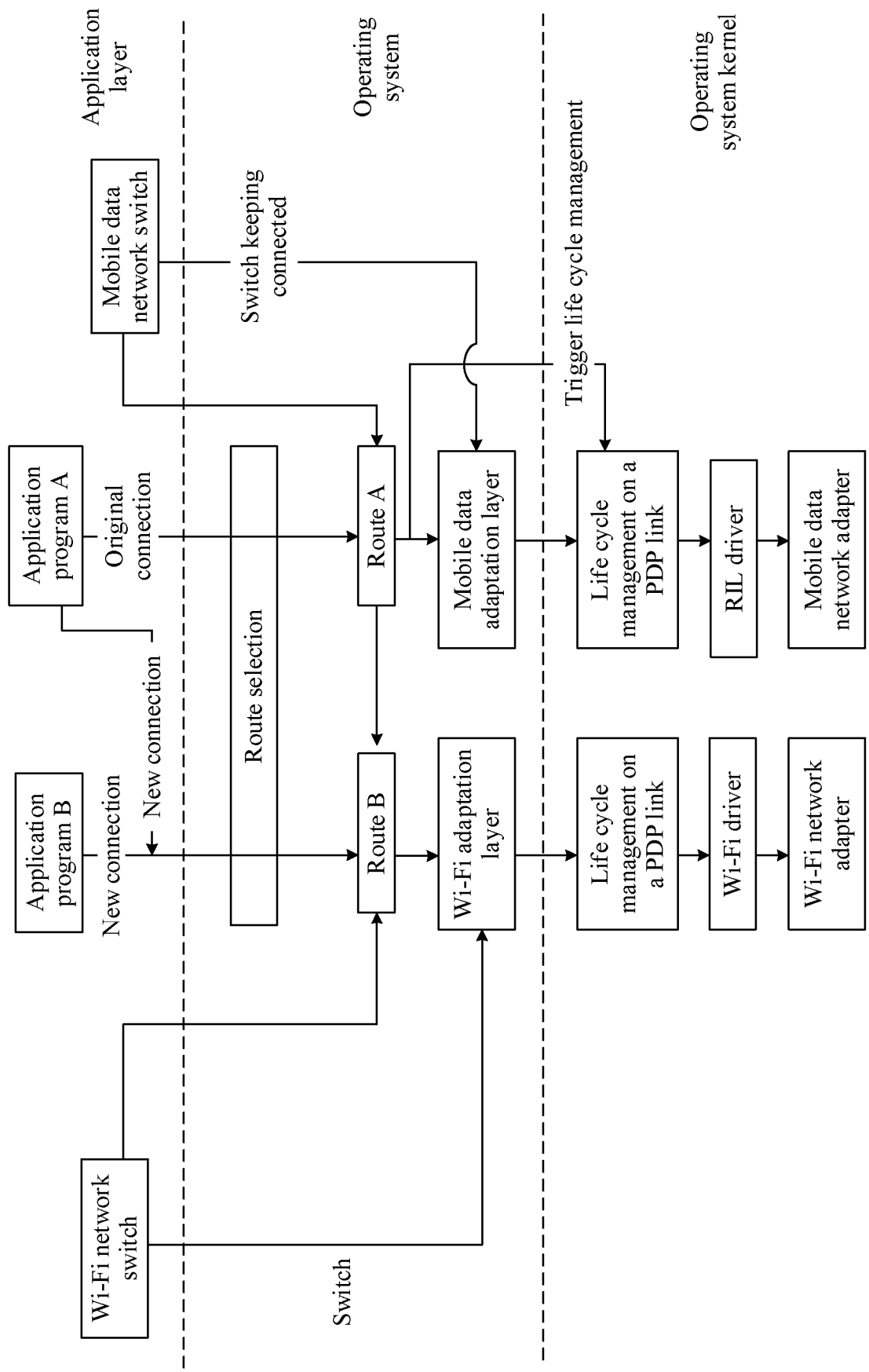
FIG. 8 is a schematic diagram of a system architecture of another terminal device according to an embodiment of this application.

FIG. 8 is a schematic diagram of a system architecture of another terminal device according to an embodiment of this application. Compared with FIG. 5, in this embodiment, an operating system of the terminal device is improved, so that a network switching does not cause an interruption to a network communication link at an application layer of the terminal device. As shown in FIG. 8, in the operating system of the terminal device, different routes are added for different networks, so that different networks use different routes. For example, a route A is added for routing to a mobile data network, and a route B is added for routing to a Wi-Fi network. The route A is a route for all connections established for communication over the mobile data network. That is, a connection to the mobile data network from the terminal device may be sent to a mobile data network adapter in an operating system kernel via the route A. The route B is a route for all connections established for communication over the Wi-Fi network. That is, a connection to the Wi-Fi network from the terminal device may be sent to a Wi-Fi network adapter in the operating system kernel via the route B. In this embodiment, the mobile data network adapter and the Wi-Fi network adapter may be physical network adapters.

As shown in FIG. 5, there is only one default route in the operating system of the terminal device. At a same moment, the route selection switch can be connected to only one of the Wi-Fi adaptation layer and the mobile data adaptation layer. In other words, at the same moment, the terminal device can be connected to only one of the mobile data network and the Wi-Fi network. However, in this embodiment of this application, when the terminal device switches from the mobile data network to the Wi-Fi network, the processor of the terminal device 20 may separately control states of the mobile data network adapter and the Wi-Fi network adapter, so that the mobile data network adapter and the Wi-Fi network adapter may be in an enabled state simultaneously, and when the application program A retains the connection to the mobile data network, the application program B can connect to the Wi-Fi network simultaneously.

As shown in FIG. 8, an original connection refers to a connection between the terminal device and the mobile data network before the terminal device switches from the mobile data network to the Wi-Fi network, such as the socket A connection between the application program A and the server 1 through the mobile data network adapter in the foregoing embodiment. A new connection refers to a connection between the terminal device and the Wi-Fi network after the terminal device switches from the mobile data network to the Wi-Fi network, such as the socket B connection between the application program B and the server 2 established through the Wi-Fi network adapter, and the connection between the application program A and the server 2 established by the terminal device 20 through the Wi-Fi network adapter in the foregoing embodiment.

Specifically, before the terminal device switches from the mobile data network to the Wi-Fi network, the socket A connection between the application program A and the server 1 is established through the mobile data network adapter. When the terminal device switches from the mobile data network to the Wi-Fi network, the terminal device records a correspondence between the socket A and identification information of the mobile data network adapter, and retains an enabled state of the mobile data network adapter, to retain the connection between the application program A and the mobile data network. After the terminal device switches from the mobile data network to the Wi-Fi network, if the application program A requests to establish a new network connection to the server 2, the terminal device may establish a connection between the application program A and the server 2 through the Wi-Fi network adapter. In other words, when the terminal device retains the socket A connection between the application program A and the server 1, a connection between the application program A and the server 2 may be further established. In addition, after the terminal device switches from the mobile data network to the Wi-Fi network, if the application program B requests to establish a network connection, for example, the application program B requests to establish a connection to the server 2, the terminal device may further establish a socket B connection between the application program B and the server 2 through the Wi-Fi network adapter. The original connection may be sent to the mobile data network adapter in the operating system kernel via the route A, and a request for the new connection may be sent to the Wi-Fi network adapter in the operating system kernel via the route B, so that the terminal device may connect to different networks through different routes simultaneously.

Figure 9A:
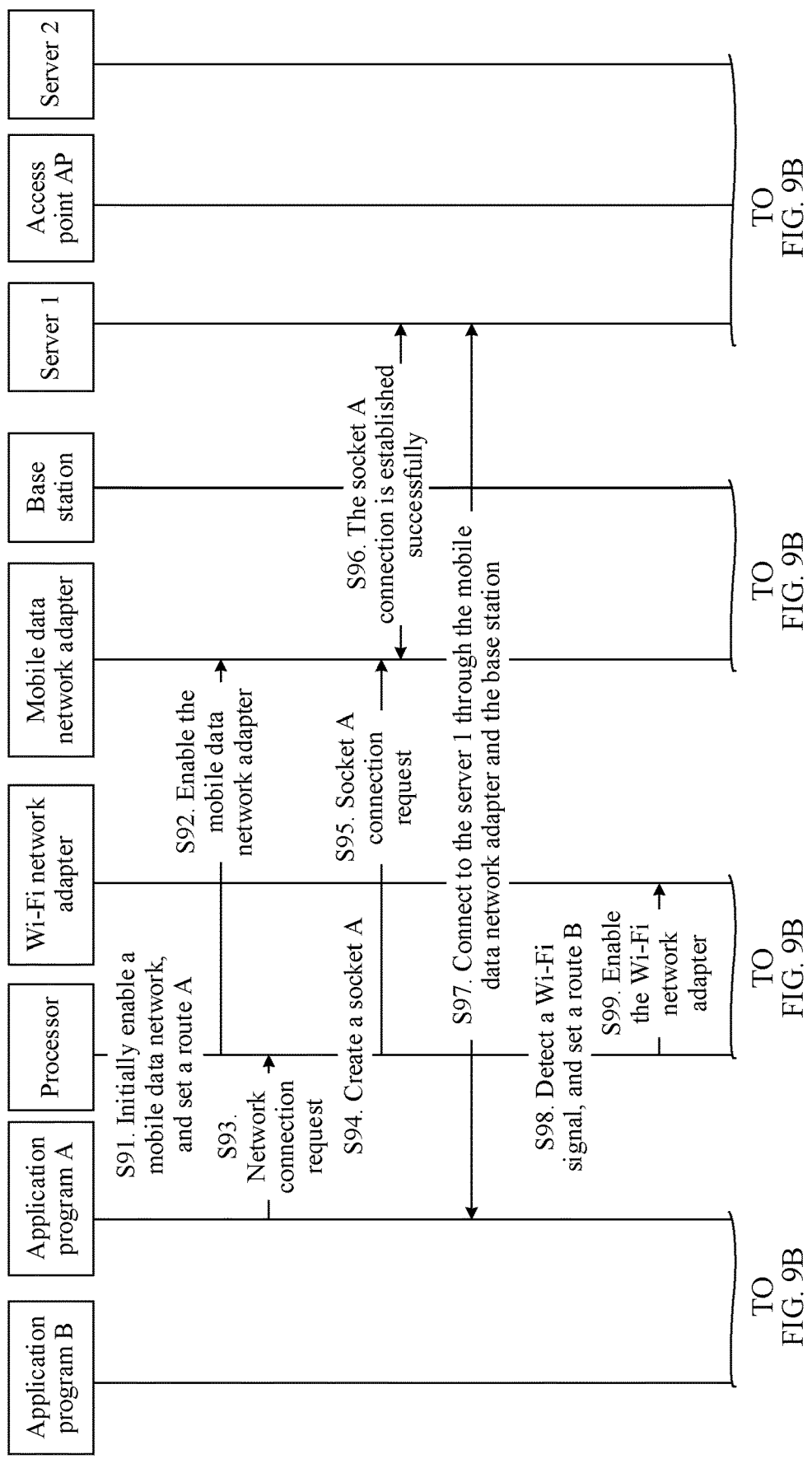
FIG. 9A, FIG. 9B, and FIG. 9C are a signaling diagram of a network switching method according to an embodiment of this application.
Figure 9B:
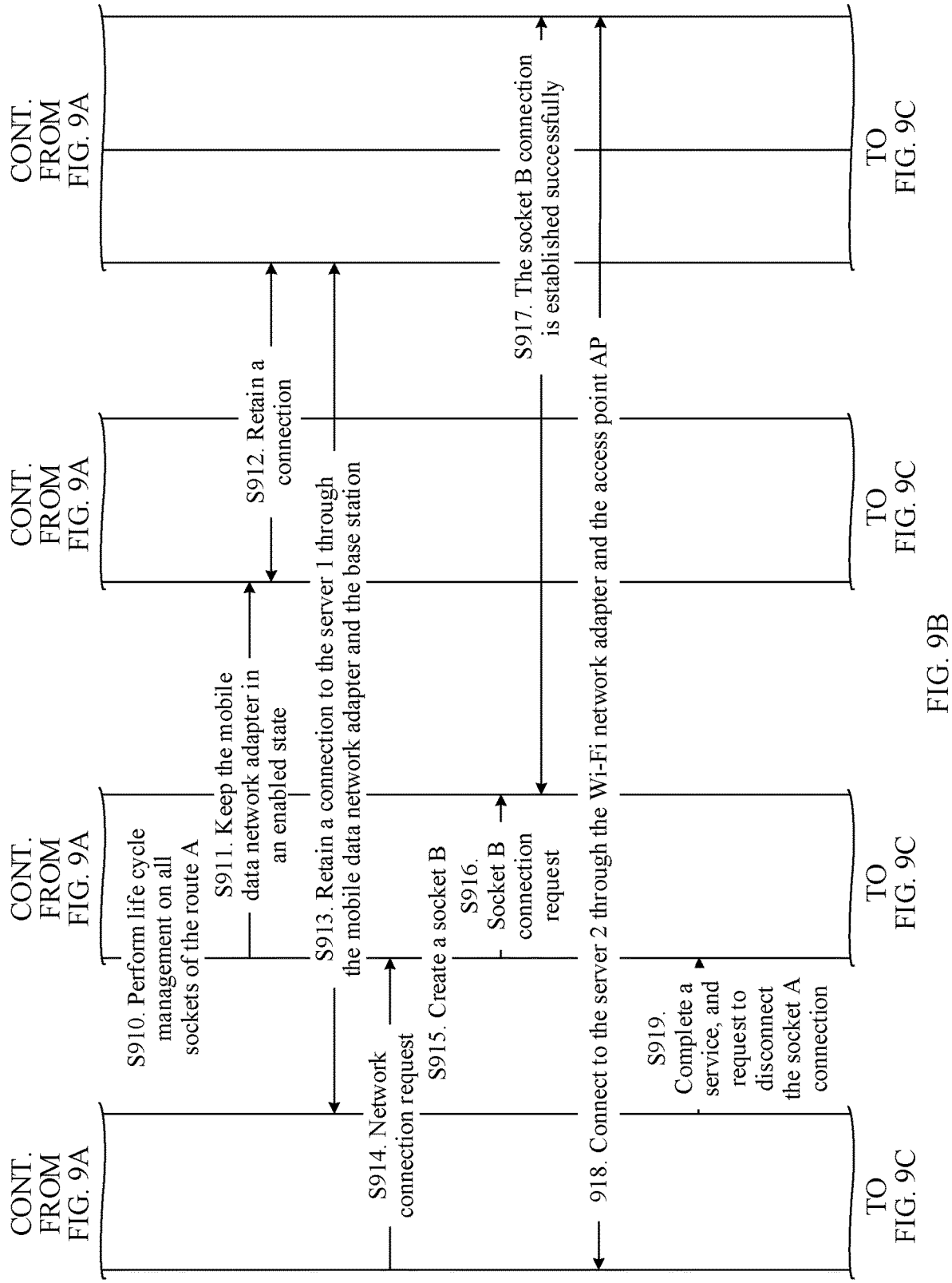
Figure 9C:
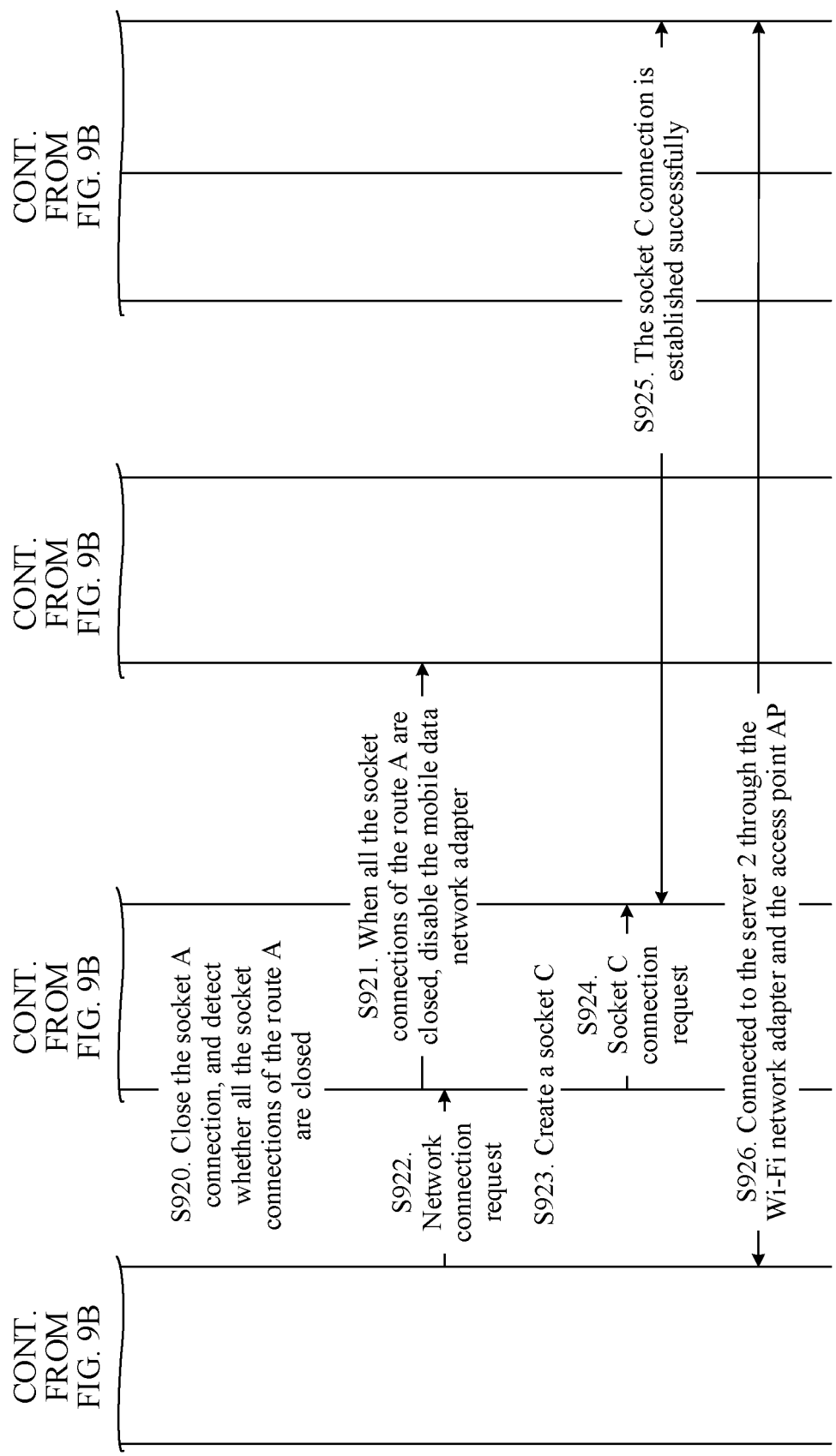

FIG. 9A, FIG. 9B, and FIG. 9C are a signaling diagram of a network switching method according to an embodiment of this application. As shown in FIG. 9A, FIG. 9B, and FIG. 9C, an application program A and an application program B are application programs installed in a terminal device, and a processor, a Wi-Fi network adapter, and a mobile data network adapter are all internal components of the terminal device. A Wi-Fi network device may be specifically an access point AP in a Wi-Fi network, and a mobile data network device may be specifically a base station in a mobile data network. As shown in FIG. 9A, FIG. 9B, and FIG. 9C, signaling interaction between the application program A, the application program B, the processor, the Wi-Fi network adapter, the mobile data network adapter, the mobile data network device, and the Wi-Fi network device includes the following steps S91 to S926.

S91. The processor initially enables the mobile data network, and sets a route A.

As shown in FIG. 2, a user turns on the mobile data network switch 23 and turns off the Wi-Fi network switch 24. In this case, the terminal device may perform communication over the mobile data network, the processor in the terminal device sets the route A, and the route A is a route for all connections established for communication over the mobile data network. That is, a connection to the mobile data network from the terminal device may be sent to the mobile data network adapter in the operating system kernel through the route A. As shown in FIG. 7, the route A may specifically refer to a route from the processor to the mobile data network adapter. The connection between the terminal device 20 and the base station is established through the mobile data network adapter. Further, the terminal device 20 establishes a connection to the server 1 through the mobile data network adapter and the base station.

S92. The processor enables the mobile data network adapter.

Specifically, the processor sends an enabling command to the mobile data network adapter, so that the mobile data network adapter is in an enabled state.

S93. The application program A sends a network connection request to the processor.

When the application program A needs to communicate with a service process of the server 1, the application program A sends a network connection request to the processor. The network connection request is used to request to communicate with the service process of the server 1, and the network connection request may include an IP address of the server 1 and a port number corresponding to the service process of the server 1.

S94. The processor creates a socket A.

After receiving the network connection request sent by the application program A, the processor creates the socket A based on the IP address of the server 1, the port number corresponding to the service process in the server 1, an IP address of the terminal device, and a port number corresponding to the application program A.

S95. The processor sends a socket A connection request to the mobile data network adapter.

The network connection request sent by the application program A to the processor is based on an application layer protocol, and the socket A connection request is based on a transport layer protocol. The application program A may communicate with the service process of the server 1 after the socket A connection is established. In other words, after the terminal device establishes the socket A connection to the server 1, the application program A communicates with the service process of the server 1 through the socket A connection.

Therefore, the processor needs to establish the socket A connection to the server 1. Specifically, the processor sends the socket A connection request to the mobile data network adapter, and the socket A connection request is sent to the server 1 through the mobile data network adapter.

S96. The socket A connection is established successfully.

The mobile data network adapter sends the socket A connection request to the mobile network device. The mobile network device may be specifically a base station. The base station further sends the socket A connection request to the server 1. After receiving the socket A connection request, the server 1 starts establishing a socket A connection to the terminal device through the base station and the mobile data network adapter, and the socket A connection is established successfully.

S97. The application program A connects to the server 1 through the mobile data network adapter and the base station.

After the socket A connection is established successfully, the application program A may connect to the server 1 through the mobile data network adapter and the base station. In this case, the application program A connects to the base station through the mobile data network adapter.

S98. The processor detects a Wi-Fi signal and sets a route B.

When the terminal device detects the Wi-Fi signal of an available Wi-Fi network, the terminal device switches from the mobile data network to the Wi-Fi network, and the processor sets a route B. The route B is a route for all connections established for communication over the Wi-Fi network. That is, a Wi-Fi network connection from the terminal device may be sent to the Wi-Fi network adapter in the operating system kernel through the route B. As shown in FIG. 7, the route B may specifically refer to a route from the processor to the Wi-Fi network adapter. The connection between the terminal device 20 and the access point AP is established through the Wi-Fi network adapter. Further, the terminal device 20 establishes a connection to the server 2 through the Wi-Fi network adapter and the access point AP.

S99. The processor enables the Wi-Fi network adapter.

Specifically, the processor sends an enabling command to the Wi-Fi network adapter, so that the Wi-Fi network adapter is in an enabled state. In this embodiment, when a network switching occurs on the terminal device, the processor may separately control states of the mobile data network adapter and the Wi-Fi network adapter, so that the mobile data network adapter and the Wi-Fi network adapter can be in the enabled state simultaneously.

S910. The processor performs life cycle management on all sockets of the route A.

For example, the application program of the terminal device 20 is not limited to the application program A and the application program B, and another application program such as an application program C or an application program D may further be installed. When the terminal device 20 does not detect a Wi-Fi signal of an available Wi-Fi network, and the terminal device 20 connects to the mobile data network, the application program A may send the network connection request to the processor, and the application program C and the application program D may also send network connection requests to the processor. The application program that sends the network connection request is not limited thereto. The processor not only establishes the socket A connection between the application program A and the server 1 via the route A, for example, a route from the processor to the mobile data network adapter, but may also establish a socket C connection between the application program C and a server 3 via the route A, and establish a socket D connection between the application program D and a server 4 via the route A.

When the terminal device detects a Wi-Fi signal of an available Wi-Fi network, the terminal device switches from the mobile data network to the Wi-Fi network, and records correspondences between all socket connections established through the mobile data network adapter and identification information of the mobile data network adapter, that is, correspondences between all socket connections established via the route A and identification information of the mobile data network adapter are recorded. For example, the processor may create a list shown in the following Table 3.

TABLE 3

| Identification information of the mobile data network adapter | Socket A |
|---|---|
| Identification information of the mobile data network adapter | Socket C |
| Identification information of the mobile data network adapter | Socket D |

The socket A may include the IP address of the terminal device, the port number corresponding to the application program A, the IP address of the server 1, and the port number corresponding to the service process of the server 1. The correspondence between the identification information of the mobile data network adapter and the socket A indicates that the communication between the application program A of the terminal device and the service process of the server 1 is established via the route A from the processor to the mobile data network adapter. Similarly, the correspondence between the identification information of the mobile data network adapter and the socket C in Table 3 indicates communication between the application program C of the terminal device and a service process of the server 3 is established via the route A, and the correspondence between the identification information of the mobile data network adapter and the socket D indicates that communication between the application program D of the terminal device and a service process of the server 4 is established via the route A.

The socket A, socket D, and socket C are sockets of the route A. The life cycle management performed on all the sockets of the route A means: when the terminal device switches from the mobile data network to the Wi-Fi network, recording all the sockets of the route A, and keeping the enabled state of the mobile data network adapter, so that the network switching does not cause an interruption to the socket connection corresponding to each socket shown in Table 3.

After creating the list shown in Table 3, the processor detects whether the socket A connection, the socket C connection, or the socket D connection is ended. When detecting that at least one of the socket A connection, the socket C connection, and the socket D connection is ended, the processor deletes an entry corresponding to the connection in Table 3. For example, when the socket A connection between the application program A and the server 1 is ended, the processor deletes the first row from Table 3, or when the application program C requests to end the socket C connection to the server 3, the processor deletes the second row in Table 3, and so on. However, provided that Table 3 is not empty, it indicates that at least one application program on the terminal device needs to retain a connection to the server through the mobile data network adapter. In this case, the processor continues to keep the mobile data network adapter in the enabled state. When the link information corresponding to the identification information of the mobile data network adapter in Table 3 is all deleted, and Table 3 is empty, it indicates that the application program on the terminal device in the Wi-Fi network does not need to retain the connection to the server through the mobile data network adapter. In this case, the processor controls the mobile data network adapter to be disabled.

S911. The processor controls the mobile data network adapter to keep in the enabled state.

When Table 3 is not empty, it indicates that at least one application program on the terminal device needs to retain a connection to the server through the mobile data network adapter. In this case, the processor continues to keep the mobile data network adapter in the enabled state.

S912. The mobile data network adapter retains the connection to the server 1 through the base station.

The mobile data network adapter keeps in the enabled state, and the mobile data network adapter retains a connection to the server 1 through the base station.

S913. The application program A retains the connection to the server 1 through the mobile data network adapter and the base station. The mobile data network adapter keeps in the enabled state, the socket A connection between the application program A and the server 1 is not ended, and the application program A may keep communicating with the service process in the server 1.

S914. The application program B sends a network connection request to the processor.

When the application program B needs to communicate with a service process of the server 2, the application program B sends a network connection request to the processor. The network connection request is used to request to communicate with the service process of the server 2, and the network connection request may include an IP address of the server 2 and a port number corresponding to the service process of the server 2.

S915. The processor creates a socket B.

After receiving the network connection request sent by the application program B, the processor creates the socket B based on the IP address of the server 2, the port number corresponding to the service process in the server 2, the IP address of the terminal device, and a port number corresponding to the application program B.

S916. The processor sends the socket B connection request to the Wi-Fi network adapter.

The network connection request sent by the application program B to the processor is a connection request based on an application layer protocol, and the socket B connection request is a connection request based on a transport layer protocol. The application program B may communicate with the service process of the server 2 after the socket B connection is established. In other words, after the terminal device establishes the socket B connection to the server 2, the application program B communicates with the service process of the server 2 through the socket B connection.

Therefore, the processor needs to establish the socket B connection to the server 2. Because the application program B sends the network connection request to the processor after the terminal device switches from the mobile data network to the Wi-Fi network, the processor sends the socket B connection request to the Wi-Fi network adapter, and the socket B connection request is sent to the server 2 through the Wi-Fi network adapter.

S917. The socket B connection is established successfully.

The Wi-Fi network adapter sends the socket B connection request to the Wi-Fi network device. The Wi-Fi network device may be specifically an access point AP. The access point AP further sends the socket B connection request to the server 2. After receiving the socket B connection request, the server 2 starts establishing a socket B connection to the terminal device through the access point AP and the Wi-Fi network adapter, and the socket B connection is established successfully.

S918. The application program B connects to the server 2 through the Wi-Fi network adapter and the access point AP.

After the socket B connection is established successfully, the application program B may connect to the server 2 through the Wi-Fi network adapter and the access point AP. In this case, the application program B connects to the access point AP through the Wi-Fi network adapter.

S919. The application program A requests the processor to close the socket A connection after a service related to the application program A is complete.

When communication between the application program A and the service process of the server 1 is ended, the application program A sends, to the processor, request information used to close the socket A connection.

S920. The processor closes the socket A connection, and detects whether all the socket connections of the route A are closed.

The processor controls the socket A connection between the application program A and the server 1 to end, deletes the first row from Table 3, and detects whether all the socket connections of the route A are closed. Specifically, the processor may detect, by checking whether Table 3 is empty, whether all the socket connections of the route A are ended. After creating the list shown in Table 3, the processor detects whether all the socket connections such as the socket A connection, the socket C connection, and the socket D connection of the route A are ended, and when detecting that at least one connection of the socket A connection, the socket C connection, and the socket D connection is ended, the processor deletes an entry corresponding to the connection from Table 3. Therefore, when all the socket connections of the route A are closed, namely ended, Table 3 is empty; and when at least one socket connection of the route A is not ended, Table 3 is not empty.

S921. When all the socket connections of the route A are closed, the processor controls the mobile data network adapter to be disabled.

When all the socket connections of the route A are closed, that is, ended, Table 3 is empty, it indicates that no application program in the terminal device retaining the connection to the server through the mobile data network adapter and the base station. In this case, the processor controls the mobile data network adapter to be disabled.

S922. The application program A sends a network connection request to the processor again.

After the mobile data network adapter is disabled, when the application program A needs to communicate with a service process, for example, a service process of the server 2, the application program A sends the network connection request to the processor, where the network connection request is used to request to communicate with the service process of the server 2. The network connection request may include an IP address of the server 2 and a port number corresponding to the service process in the server 2.

S923. The processor creates a socket C.

After receiving the network connection request sent by the application program A, the processor creates the socket C based on the IP address of the server 2, the port number corresponding to the service process in the server 2, the IP address of the terminal device, and the port number corresponding to the application program A.

S924. The processor sends the socket C connection request to the Wi-Fi network adapter.

Because the mobile data network adapter is disabled, and the terminal device switches from the mobile data network to the Wi-Fi network, the processor sends the socket C connection request to the Wi-Fi network adapter.

S925. The socket C connection is established successfully.

The Wi-Fi network adapter sends the socket C connection request to the Wi-Fi network device. The Wi-Fi network device may be specifically an access point AP. The access point AP further sends the socket C connection request to the server 2. After receiving the socket C connection request, the server 2 starts establishing a socket C connection to the terminal device through the access point AP and the Wi-Fi network adapter, and the socket C connection is established successfully.

S926. The application program A connects to the server 2 through the Wi-Fi network adapter and the access point AP.

After the socket C connection is established successfully, the application program A may connect to the server 2 through the Wi-Fi network adapter and the access point AP. In this case, the application program A connects to the access point AP through the Wi-Fi network adapter.

In this embodiment, when the terminal device switches from the first network to the second network, if the terminal device has a plurality of application programs connected to the first network before the switching, the terminal device records connections between the plurality of application programs and the first network, and keeps the mobile data network adapter of the terminal device in the enabled state, so that the network switching does not cause an interruption to the connections between the plurality of application programs and the first network, thereby ensuring that a service of the application program can be properly used during network switching, and improving data transmission performance. In addition, after the terminal device switches from the first network to the second network, the terminal device detects whether the connections between the plurality of application programs and the first network are ended; if the connection between at least one of the plurality of application programs and the first network is not ended, the terminal device keeps the mobile data network adapter in the enabled state; and when all the connections between the plurality of application programs and the first network are ended, the terminal device controls the mobile data network adapter to be disabled, to avoid wasting a resource of the first network.

On the basis of the foregoing embodiment, the terminal device may further provide a configuration option for the user. Before the terminal device switches from the first network to the second network, the user may perform an operation on the configuration option, to determine that when the terminal device switches from the first network to the second network and a first application on the terminal device connects to the first network, the first application keeps connected to the first network. Correspondingly, before the terminal device switches from the first network to the second network, the terminal device receives the configuration information of the user, where the configuration information is used to retain the connection between the first application and the first network when the terminal device switches from the first network to the second network.

For example, before the terminal device switches from the mobile data network to the Wi-Fi network, the terminal device receives the configuration information of the user, where the configuration information is used to retain the connection between the first application, for example, the application program A in the foregoing embodiment, and the mobile data network when the terminal device switches from the mobile data network to the Wi-Fi network. During network switching, a specific method and principle for keeping the application program A connected to the mobile data network are similar to those in the foregoing embodiment, and details are not described herein again.

In addition, when the terminal device switches from the first network to the second network, the terminal device may further generate prompt information, where the prompt information is used to prompt the user whether to keep the first application connected to the first network.

In this embodiment, the first application program is an application program that is connected to the first network before the switching when the terminal device switches from the first network to the second network in the foregoing embodiment.

For example, the first application program is specifically the application program A in the foregoing embodiment. When detecting the Wi-Fi signal, the terminal device may send the prompt information to the user, to prompt the user whether to retain the connection between the application program A and the mobile data network. If the user determines, based on the prompt information, to retain the connection between the application program A and the mobile data network when the terminal device switches from the mobile data network to the Wi-Fi network, when the terminal device detects a Wi-Fi signal, the terminal device retains the connection between the application program A and the mobile data network by using the method in the foregoing embodiment.

In addition, the first application may be at least one target application selected by the user from a plurality of applications on the terminal device. The user may select the at least one application program from the plurality of application programs of the terminal device, and set connection retention during a network switching for the application program. For example, the terminal device 20 includes an application program A and an application program B. The application program A is an application program having a relatively high real-time requirement, for example, a game application program, and the application program B is an application program having a relatively low real-time requirement. The user may set connection retention during network switching for the application program A, and does not set connection retention for the application program B. When the terminal device switches from the mobile data network to the Wi-Fi network, if the application program A and the application program B are connected to the mobile data network simultaneously, the terminal device retains only the connection between the application program A and the mobile data network according to the setting of the user for the application program A, and does not retain the connection between the application program B and the mobile data network.

In this embodiment, the terminal device generates the prompt information, to prompt the user whether to retain the connection between the first application program and the first network when the terminal device switches from the first network to the second network. If the first network before the switching is the mobile data network, the second network after the switching is the Wi-Fi network, when the terminal device in the Wi-Fi network retains the connection between the application program and the mobile data network, mobile data network traffic is consumed. By using the prompt information, the user may determine, based on actual traffic of the user, whether to retain the connection between the application program and the mobile data network during the network switching. This feature prevents mobile data network traffic from being consumed without known to the user.

Figure 10:
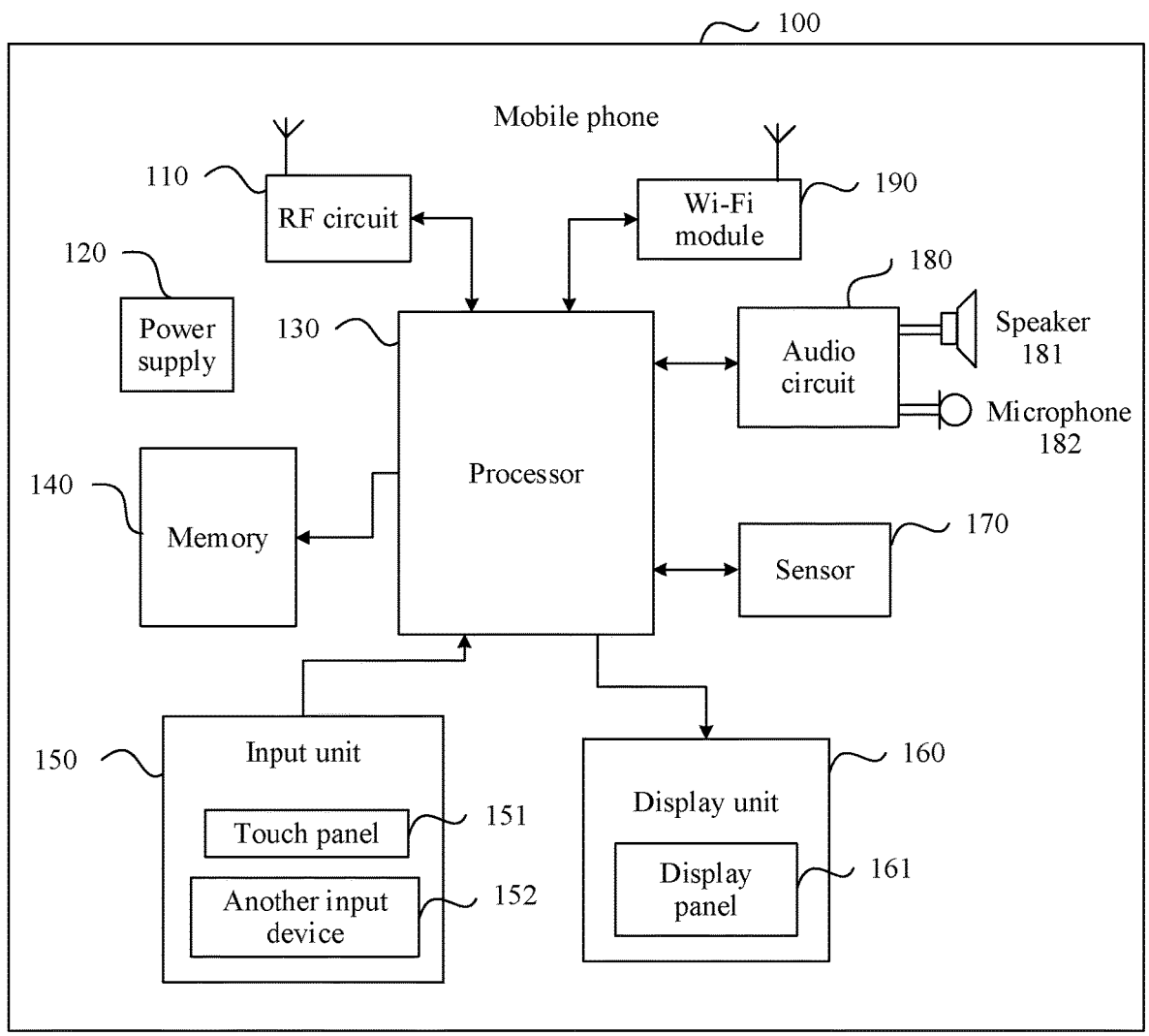
FIG. 10 is a schematic structural diagram of a terminal device according to an embodiment of this application.

FIG. 10 is a schematic structural diagram of a terminal device according to an embodiment of this application. The terminal device may be specifically a mobile phone. As shown in FIG. 10, a mobile phone 100 includes components including a radio frequency (Radio Frequency, RF) circuit 110, a power supply 120, a processor 130, a memory 140, an input unit 150, a display unit 160, a sensor 170, an audio circuit 180, a wireless fidelity (Wi-Fi) module 190, and the like. It may be understood that the structure of the mobile phone shown in FIG. 10 does not constitute a limitation to the mobile phone, and the mobile phone may include more or fewer components than those shown in the figure, or some components may be combined, or a different component arrangement may be used. Main components involved in this application include the radio frequency circuit 110, the processor 130, the wireless module 190, and software design of an operating system running on the processor 130. In this embodiment, a cellular data network and the mobile data network described in the foregoing embodiments refer to a same network. The following specifically describes each component of the mobile phone 100 with reference to FIG. 10.

The radio frequency circuit 110 may be configured to receive and send information or receive and send a signal during a call. For example, after receiving downlink information of a base station, the radio frequency circuit 110 transmits the downlink information to the processor 130, and the processor 130 processes the downlink information. In addition, the radio frequency circuit 110 may further communicate with a network and another device through wireless communication. In this embodiment, mobile data communication is implemented via the radio frequency circuit 110. When the mobile phone switches from the mobile data network to the Wi-Fi network, an application program at a service upper layer needs to continue using the mobile data network. At this time, the processor 130 does not send a turn-off command to the radio frequency circuit 110, and the radio frequency circuit 110 continues providing mobile data communication. When all application programs at the service upper layer no longer use the mobile data network, the processor 130 sends a turn-off command to the radio frequency circuit 110 to stop mobile data communication. When the mobile phone switches from the Wi-Fi network to the mobile data network, because the radio frequency circuit 110 is in a turn-off state, the processor 130 needs to send a turn-on command to the radio frequency circuit 110, and execute some initialization commands as well, to establish a mobile data communication link.

The memory 140 may be configured to store a software program and a module. The processor 130 runs the software program, the module, operating system firmware code, and the like that are stored in the memory 140, to perform various function applications and data processing of the mobile phone 100, for example, function execution of a route selection module, function execution of a Wi-Fi adaptation module, function execution of a network setting module, and function execution of a cellular data network adaptation layer. The memory 140 may mainly include a program storage area and a data storage area. The program storage area may store an operating system, an application program required by at least one function (such as a network access function and an interface display function), and the like, and the data storage area may store data (such as audio data and a phone book) created during use of the mobile phone 100. In addition, the memory 140 may include a high-speed random access memory, or may include a non-volatile memory, such as at least one magnetic disk storage device or a flash memory device, or another volatile solid-state storage device.

The input unit 150 may be configured to: receive entered digit or character information, and generate key signal input related to user setting and function control of the mobile phone 100. Specifically, the user taps a network communication switching menu on the mobile phone to perform network switching (for example, switching from the mobile data network to the Wi-Fi network). Then, an input signal is transmitted to the processor 130, and the processor 130 delivers a command to control switching from a cellular data channel to a Wi-Fi channel.

The display unit 160 may be configured to display information entered by the user or information provided for the user, and various menus of the mobile phone 100. The display unit 160 may include a display panel 161. Optionally, the display panel 161 may be configured by using an LCD, an OLED, or the like. Further, the touch control panel 151 may cover the display panel 161. After detecting a touch operation on or near the touch control panel 151, the touch control panel 151 transfers the touch operation to the processor 130 to determine a touch event type. Subsequently, the processor 130 provides corresponding visual output on the display panel 161 based on the touch event type.

Wi-Fi is a short distance wireless transmission technology and provides wireless broadband Internet access for the user. The mobile phone 100 may help, by using the Wi-Fi module 190, the user receive and send e-mails, browse a web page, access streaming media, and so on. Although FIG. 10 shows the Wi-Fi module 190, it may be understood that the Wi-Fi module 190 is not a necessary component of the mobile phone 100, and the Wi-Fi module 190 may be omitted according to needs without departing from the scope of the essence of the present invention. In this embodiment of this application, the Wi-Fi module 190 implements functions including Wi-Fi network discovery, connection, password authentication and authorization, a proxy service, network management, and the like. When the mobile phone 100 needs to enable the Wi-Fi module 190, the processor 130 sends an enabling instruction to the Wi-Fi module 190 to enable the Wi-Fi module 190, and executes an initialization command on the Wi-Fi module 190. After the Wi-Fi module 190 is initialized, the Wi-Fi module 190 automatically searches for a Wi-Fi network. When the user selects to connect to a Wi-Fi network, the Wi-Fi module 190 requires the user to enter an access password. After the user enters the access password, the Wi-Fi module 190 implements interactive authentication with a Wi-Fi router. After the authentication succeeds, the mobile phone 100 can implement a Wi-Fi network communication function via a Wi-Fi route.

The processor 130 is a control center of the mobile phone 100, connects each part of the entire mobile phone through various interfaces and lines, and performs various functions and data processing of the mobile phone 100 by running or executing a software program and/or a module stored in the memory 140 and invoking data stored in the memory 140, thereby implementing a plurality of services on the mobile phone. After the operating system is started, a mobile operating system provides an app running environment. After the app is started, a socket creation operation is triggered. The processor 130 sends an instruction to control the Wi-Fi module 190 or the radio frequency circuit 110 to perform network communication, and obtains a returned result. When the user performs a network switching operation, the processor 130 receives the network switching operation of the user, converts the network switching operation into a control command, and sends the control command to the Wi-Fi module 190 or the radio frequency circuit 110, thereby implementing network connection switching. For example, when an app A uses a route A to perform communication through the cellular data network channel, the user performs switching from the cellular data network to the Wi-Fi network. In this case, the processor 130 needs to maintain normal use of the route A, and continue maintaining availability of the route A and the radio frequency circuit 110, to ensure that a socket connection created by the app A before the network switching can perform communication over the cellular data network. However, after the network switching, the processor 130 needs to send an enabling instruction to the Wi-Fi module 190, so that the socket connection created by the app A or a socket connection created by an app B performs communication through the Wi-Fi module 190. Once the app A no longer uses the cellular data network channel, and no other app uses the cellular data network channel, the processor 130 sends a cellular data network disabling instruction to the radio frequency circuit 110, to instruct the radio frequency circuit 110 to disable data communication.

The mobile phone 100 further includes the power supply 120 (such as a battery) supplying power to the components. The power supply may be logically connected to the processor 130 by using a power supply management system, thereby implementing functions such as management of charging, discharging, and power consumption on the power supply management system.

Although not shown, the mobile phone 100 may further include a camera, a Bluetooth module, and the like. Details are not described herein again.

Figure 11:
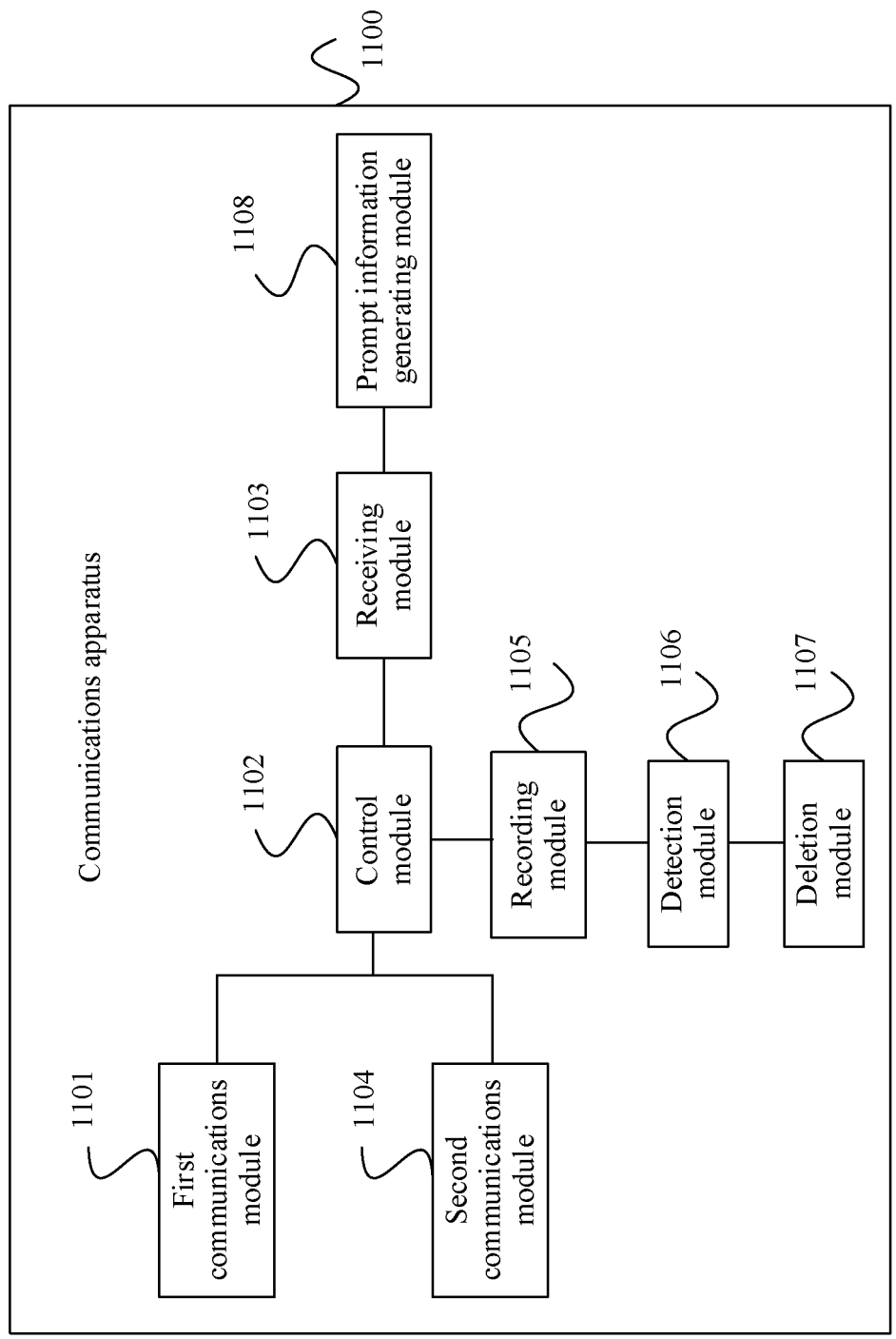
FIG. 11 is a schematic structural diagram of a communications apparatus according to an embodiment of this application.

FIG. 11 is a schematic structural diagram of a communications apparatus according to an embodiment of this application. As shown in FIG. 11, a communications apparatus 1100 includes a first communications module 1101, a control module 1102, a receiving module 1103, and a second communications module 1104. The first communications module 1101 is configured to connect the communications apparatus to a first network, and a first application on the communications apparatus is connected to the first network. The control module 1102 is configured to: when the communications apparatus switches from the first network to a second network, retain a connection between the first application and the first network. The receiving module 1103 is configured to receive a network connection request from a second application on the communications apparatus. The second communications module 1104 is configured to connect the communications apparatus to a second network, and the second application on the communications apparatus is connected to the second network.

In FIG. 11, further, the control module 1102 is specifically configured to: when the communications apparatus switches from the first network to the second network, keep the first communications module in the communications apparatus enabled, where the first application is connected to the first network through the first communications module.

In the foregoing embodiment, the communications apparatus 1100 further includes a recording module 1105. The recording module 1105 is configured to record information about a link between the communications apparatus and the first network when the communications apparatus switches from the first network to the second network, where the information about the link includes identification information of the first communications module and information about a connection over which the communications apparatus connects to the first network through the first communications module.

In the foregoing embodiment, the communications apparatus 1100 further includes a detection module 1106 and a deletion module 1107. The detection module 1106 is configured to: after the recording module records the information about the link between the communications apparatus and the first network, detect whether the connection between the first application and the first network is ended. The deletion module 1107 is configured to: when the detection module detects that the connection between the first application and the first network is ended, delete link information corresponding to the first application.

In the foregoing embodiment, the control module 1102 is further configured to: when all the link information corresponding to the first communications module is deleted, control the first communications module to be disabled.

In the foregoing embodiment, the control module 1102 is further configured to control a second communications module in the communications apparatus to be enabled. The second application is connected to the second network through the second communications module.

In the foregoing embodiment, after the communications apparatus switches from the first network to the second network, the receiving module 1103 is further configured to receive a network connection request from the first application; and the second communications module 1104 is further configured to connect the first application to the second network.

In the foregoing embodiment, before the communications apparatus switches from the first network to the second network, the receiving module 1103 is further configured to receive configuration information of a user, where the configuration information is used to retain the connection between the first application and the first network when the communications apparatus switches from the first network to the second network.

In the foregoing embodiment, the communications apparatus 1100 further includes a prompt information generating module 1108. The prompt information generating module 1108 is configured to generate prompt information when the communications apparatus switches from the first network to the second network, where the prompt information is used to prompt the user whether to keep the first application connected to the first network.

In the foregoing embodiment, the first application is at least one target application selected by the user from a plurality of applications on the communications apparatus.

In the foregoing embodiment, the first network may be a mobile data network, and the second network may be a wireless local area network WLAN. The first communications module 1101 in the communications apparatus includes a mobile data network adapter, and the second communications module 1104 in the communications apparatus includes a wireless fidelity Wi-Fi network adapter.

The communication apparatus of the embodiments shown in FIG. 11 may be used to execute the technical solutions of the foregoing method embodiments. The implementation principles and technical effects are similar, and are not further described herein.

It should be understood that division of the various modules of the communications apparatus is merely division of logical functions. In actual implementation, all or some of the modules may be integrated into one physical entity or may be physically separated. The modules may all be implemented in a form in which a processing element invokes software, or may all be implemented in a form of hardware; or some modules may be implemented in a form in which a processing element invokes software, and some modules are implemented in a form of hardware. For example, the control module may be an independent processing element; or may be integrated in a chip of the communications apparatus, for example, a terminal device, for implementation; or moreover, may alternatively be stored in a memory of the communications apparatus in a form of a program, and is invoked by a processing element of the communications apparatus to perform the functions of the foregoing modules. Implementations of the other modules are similar thereto. In addition, all or some of the modules may be integrated together, or may be implemented separately. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing methods, for example, one or more application-specific integrated circuits (ASIC), one or more microprocessors (digital signal processor, DSP), or one or more field programmable gate arrays (FPGA). For another example, when a module is implemented in a form of a program invoked by a processing element, the processing element may be a general-purpose processor, for example, a central processing unit (CPU) or another processor that can invoke the program. For another example, the modules may be integrated together, and implemented in a form of a system-on-a-chip (SOC).

Figure 12:
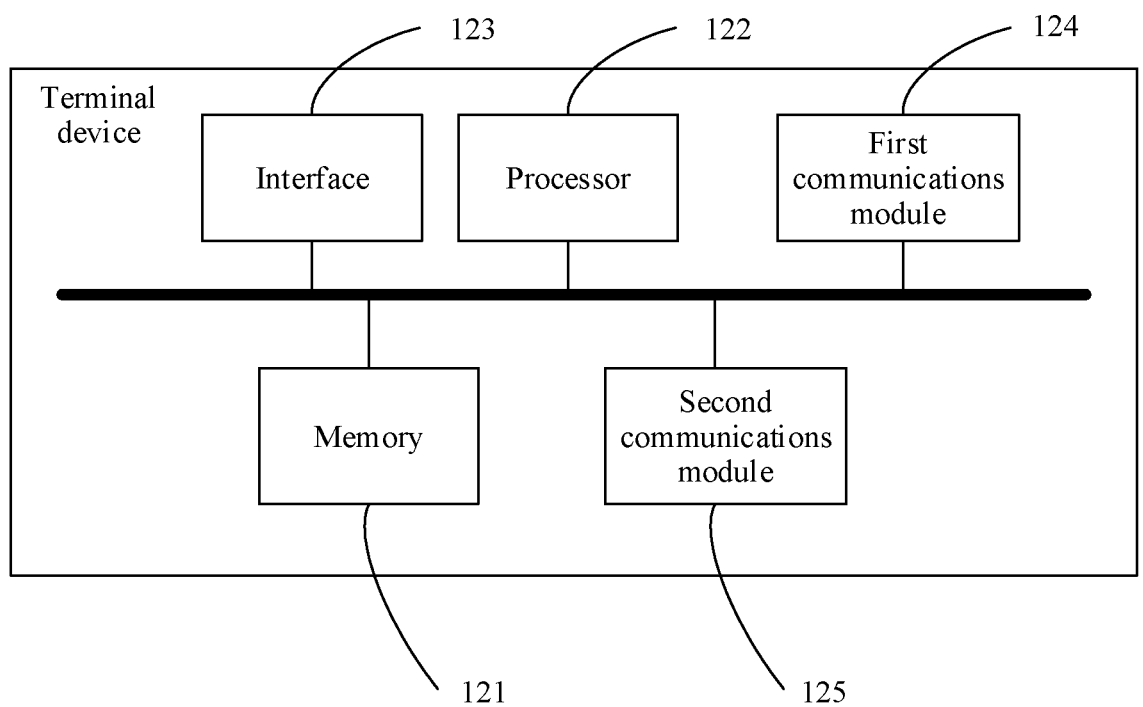
FIG. 12 is a schematic structural diagram of a terminal device according to an embodiment of this application.

FIG. 12 is a schematic structural diagram of a terminal device according to an embodiment of this application. As shown in FIG. 12, the terminal device 120 includes a memory 121, a processor 122, and an interface 123. The memory 121 is configured to store a computer program. The processor 122 invokes the computer program, and when being executed, the computer program is used to perform the following operations: connecting to a first network, and connecting a first application on the terminal device to the first network; when the terminal device switches from the first network to a second network, retaining a connection between the first application and the first network; receiving, through the interface 123, a network connection request from a second application on the terminal device; and connecting the second application to the second network.

In FIG. 12, further, the terminal device 120 further includes a first communications module 124. When the terminal device 120 switches from the first network to the second network, the processor 122 retains the connection between the first application and the first network, and the processor 122 is specifically configured to keep a first communications module 124 in the terminal device enabled, where the first application is connected to the first network through the first communications module.

In the foregoing embodiment, when the terminal device 120 switches from the first network to the second network, the processor 122 is further configured to record information about a link between the terminal device and the first network, where the information about the link includes identification information of the first communications module and information about a connection over which the terminal device connects to the first network through the first communications module.

In the foregoing embodiment, after recording the information about the link between the terminal device and the first network, the processor 122 is further configured to detect whether the connection between the first application and the first network is ended; and delete link information corresponding to the first application if the connection between the first application and the first network is ended.

In the foregoing embodiment, when all link information corresponding to the first communications module is deleted, the processor 122 is further configured to control the first communications module 124 to be disabled.

In the foregoing embodiment, the terminal device 120 further includes a second communications module 125. When connecting the second application to the second network, the processor 122 is specifically configured to control the second communications module 125 of the terminal device 120 to be enabled; and connect the second application to the second network through the second communications module 125.

In the foregoing embodiment, after the terminal device 120 switches from the first network to the second network, the processor 122 is further configured to receive a network connection request from the first application through the interface 123 and connect the first application to the second network.

In the foregoing embodiment, before the terminal device switches from the first network to the second network, the processor 122 is further configured to receive configuration information of a user, where the configuration information is used to retain the connection between the first application and the first network when the terminal device switches from the first network to the second network.

In the foregoing embodiment, when the terminal device switches from the first network to the second network, the processor 122 is further configured to generate prompt information, where the prompt information is used to prompt the user whether to keep the first application connected to the first network.

In the foregoing embodiment, the first application is at least one target application selected by the user from a plurality of applications on the terminal device.

In the foregoing embodiment, the first network may be a mobile data network, and the second network may be a wireless local area network WLAN. The first communications module 124 includes a mobile data network adapter, and the second communications module 125 includes a wireless fidelity Wi-Fi network adapter.

The terminal device in the embodiment shown in FIG. 12 may be used to execute the technical solutions of the foregoing method embodiments. The implementation principles and technical effects are similar, and are not further described herein.

The memory 121 is configured to store a program configured to implement the foregoing method embodiments or the modules in the embodiment shown in FIG. 11. The processor 122 invokes the program to perform operations in the foregoing method embodiments, to implement the modules shown in FIG. 11.

Alternatively, some or all of the modules may also be embedded, in a form of an integrated circuit, on a chip of the terminal device for implementation. In addition, the modules may be independently implemented, or may be integrated together. The foregoing modules may be configured as one or more integrated circuits for implementing the foregoing methods, for example, one or more application-specific integrated circuits (ASIC), one or more microprocessors (DSP), or one or more field programmable gate arrays (FPGA).

In addition, an embodiment of this application further provides a computer-readable storage medium. The computer-readable storage medium stores a computer program, and when the computer program is run on a computer, the computer is enabled to perform the network switching method according to the foregoing embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. A network switching method, wherein the method comprises:

connecting, by a terminal device, to a first network, wherein a first application on the terminal device is connected to the first network;
switching, by the terminal device, from the first network to a second network, and retaining a connection between the first application and the first network;
receiving, by the terminal device, a network connection request from a second application on the terminal device; and
connecting, by the terminal device, the second application to the second network.

2. The method according to claim 1, wherein the switching, by the terminal device, from the first network to a second network, and retaining a connection between the first application and the first network comprises:
switching, by the terminal device, from the first network to the second network, and keeping a first communications module in the terminal device enabled, wherein the first application is connected to the first network through the first communications module.

3. The method according to claim 2, wherein the method further comprises:
switching, by the terminal device, from the first network to the second network, and recording information about a link between the terminal device and the first network, wherein the information about the link comprises identification information of the first communications module and information about a connection over which the terminal device connects to the first network through the first communications module.

4. The method according to claim 3, wherein after the recording information about a link between the terminal device and the first network, the method further comprises:
detecting whether the connection between the first application and the first network is ended; and
if the connection between the first application and the first network is ended, deleting link information corresponding to the first application.

5. The method according to claim 4, wherein the method further comprises:
when all link information corresponding to the first communications module is deleted, controlling the first communications module to be disabled.

6. The method according to claim 1, wherein the connecting, by the terminal device, the second application to the second network comprises:
controlling, by the terminal device, a second communications module in the terminal device to be enabled; and
connecting, by the terminal device, the second application to the second network through the second communications module.

7. The method according to claim 1, wherein after the switching, by the terminal device, from the first network to a second network, the method further comprises:
receiving, by the terminal device, a network connection request from the first application; and
connecting, by the terminal device, the first application to the second network.

8. The method according to claim 1, wherein the method further comprises:
before the switching, by the terminal device, from the first network to a second network, receiving configuration information of a user, wherein the configuration information is used to retain the connection between the first application and the first network when the terminal device switches from the first network to the second network.

9. A communications device, comprising:
a memory and a processor, wherein the memory comprises instructions that when executed by the processor, cause the communications device to perform the following:
connecting to a first network, wherein a first application on the communications device is connected to the first network;
switching from the first network to a second network, and retaining a connection between the first application and the first network;
receiving a network connection request from a second application on the communications device; and
connecting the second application to the second network.

10. The communications device according to claim 9, wherein the switching from the first network to a second network, and retaining a connection between the first application and the first network comprises:
switching from the first network to the second network, and keeping a first communications module in the communications device enabled, wherein the first application is connected to the first network through the first communications module.

11. The communications device according to claim 10, wherein the communications device is further configured to perform:
switching from the first network to the second network, and recording information about a link between the communications device and the first network, wherein the information about the link comprises identification information of the first communications module and information about a connection over which the communications device connects to the first network through the first communications module.

12. The communications device according to claim 11, wherein after the recording information about a link between the communications device and the first network, the communications device is further configured to perform:
detecting whether the connection between the first application and the first network is ended; and
if the connection between the first application and the first network is ended, deleting link information corresponding to the first application.

13. The communications device according to claim 12, wherein the communications device is further configured to perform:
when all link information corresponding to the first communications module is deleted, controlling the first communications module to be disabled.

14. The communications device according to claim 9, wherein the connecting the second application to the second network comprises:
controlling a second communications module in the communications device to be enabled; and
connecting the second application to the second network through the second communications module.

15. The communications device according to claim 9, wherein after the switching from the first network to a second network, the communications device is further configured to perform:
receiving a network connection request from the first application; and
connecting the first application to the second network.

16. The communications device according to claim 9, wherein the communications device is further configured to perform:

before the switching from the first network to a second network, receiving configuration information of a user, wherein the configuration information is used to retain the connection between the first application and the first network when the communications device switches from the first network to the second network.

17. A non-transitory computer-readable storage medium, wherein the computer-readable storage medium stores a computer program, and when the computer program runs on a computer, the computer is enabled to perform the following:

connecting to a first network, wherein a first application on the computer is connected to the first network;

switching from the first network to a second network, and retaining a connection between the first application and the first network;

receiving a network connection request from a second application on the computer; and connecting the second application to the second network.

18. The non-transitory computer-readable storage medium according to claim 17, wherein the switching from the first network to a second network, and retaining a connection between the first application and the first network comprises:

switching from the first network to the second network, and keeping a first communications adaptor enabled, wherein the first application is connected to the first network through the first communications adaptor.

19. The non-transitory computer-readable storage medium according to claim 18, wherein the computer is further enabled to perform:

switching from the first network to the second network, and recording information about a link between the computer and the first network, wherein the information about the link comprises identification information of the first communications module and information about a connection over which the computer connects to the first network through the first communications module.

20. The non-transitory computer-readable storage medium according to claim 19, wherein after the recording information about a link between the computer and the first network, the computer is further enabled to perform:

detecting whether the connection between the first application and the first network is ended; and if the connection between the first application and the first network is ended, deleting link information corresponding to the first application.

\* \* \* \* \*